United States Patent
Dettloff et al.

(10) Patent No.: US 8,633,733 B2
(45) Date of Patent: Jan. 21, 2014

(54) VOLTAGE MODE TRANSMITTER EQUALIZER

(75) Inventors: Wayne D. Dettloff, Cary, NC (US);
John W. Poulton, Chapel Hill, NC (US);
John M. Wilson, Raleigh, NC (US)

(73) Assignee: Rambus Inc., Sunnyvale, CA (US)

( * ) Notice: Subject to any disclaimer, the term of this patent is extended or adjusted under 35 U.S.C. 154(b) by 110 days.

(21) Appl. No.: 13/260,549

(22) PCT Filed: Mar. 26, 2010

(86) PCT No.: PCT/US2010/028871
§ 371 (c)(1),
(2), (4) Date: Sep. 26, 2011

(87) PCT Pub. No.: WO2010/111619
PCT Pub. Date: Sep. 30, 2010

(65) Prior Publication Data
US 2012/0025800 A1    Feb. 2, 2012

Related U.S. Application Data

(60) Provisional application No. 61/164,354, filed on Mar. 27, 2009, provisional application No. 61/242,319, filed on Sep. 14, 2009.

(51) Int. Cl.
*H03K 19/094* (2006.01)
(52) U.S. Cl.
USPC .................. 326/82; 326/26; 326/86; 326/87
(58) Field of Classification Search
USPC .......................................... 326/82–83, 86–87
See application file for complete search history.

(56) References Cited

U.S. PATENT DOCUMENTS

| | | | |
|---|---|---|---|
| 5,001,484 A | 3/1991 | Weiss | 341/153 |
| 6,049,300 A | 4/2000 | Shoval | 341/144 |

(Continued)

FOREIGN PATENT DOCUMENTS

| | | | |
|---|---|---|---|
| EP | 1005171 | 5/2000 | H03M 1/76 |
| EP | 1257102 A1 | 11/2002 | |

(Continued)

OTHER PUBLICATIONS

Dally, W.J., et al., "Digital Systems Engineering", 1998, Chapter 11, "Signaling Circuits", pp. 514-540. 29 pages.
Invitation to Pay Additional Fees with mail date of Oct. 6, 2010 re Int'l. Application No. PCT/US2010/028871 includes Results of the Partial Int'l. Search. 7 Pages.

(Continued)

*Primary Examiner* — Jany Richardson
(74) *Attorney, Agent, or Firm* — Hamilton, Brook, Smith & Reynolds, P.C.

(57) ABSTRACT

A voltage mode transmitter equalizer has high efficiencies, yet consumes substantially constant supply current from the power supply and provides constant back-match impedance. The voltage mode transmitter equalizer is configured such that the output voltage of the signal to be output on a pair of transmission lines can be controlled according to the input data, but its return impedance is substantially matched to the differential impedance of the transmission lines and it draws substantially constant supply current from the power supply regardless of the output voltage of the signal. Further, an equalizer for a voltage-mode transmitter provides fine-granularity equalization settings by employing a variable pull-up conductance and a variable pull-down conductance. Conductance is varied by selectively enabling a plurality of conductance channels, at least some of which have resistance values that are distinct from one another.

30 Claims, 21 Drawing Sheets

(56) References Cited

U.S. PATENT DOCUMENTS

| | | | |
|---|---|---|---|
| 6,304,201 B1 | 10/2001 | Moreland et al. | 341/154 |
| 7,227,382 B1 * | 6/2007 | Talbot et al. | 326/87 |
| 7,532,048 B1 * | 5/2009 | Shirani et al. | 327/108 |
| 7,570,071 B2 | 8/2009 | Clements et al. | 324/765 |
| 2002/0135404 A1 | 9/2002 | Payne et al. | |
| 2004/0246613 A1 | 12/2004 | Tseng | |

FOREIGN PATENT DOCUMENTS

| | | | |
|---|---|---|---|
| WO | WO 2006/078845 A2 | 7/2006 | |
| WO | WO 2011-032178 | 3/2011 | H03K 17/687 |

OTHER PUBLICATIONS

International Search Report and the Written Opinion dated May 26, 2011 re Int'l. Application No. PCT/US2010/048826. 11 Pages.

PCT Preliminary Report mailed Oct. 6, 2011 re Int'l Application No. PCT/US2010/028871 filed Mar. 26, 2010. 11 Pages.

International Preliminary Report on Patentability (Chapter I) and Written Opinion dated Mar. 29, 2012 re Int'l Application No. PCT/US10/048826. 8 pages.

International Search Report and Written Opinion of the International Searching Authority mailed Dec. 14, 2010 from International Application No. PCT/US2010/028871 filed Mar. 26, 2010.

\* cited by examiner

|    | Switched      | Equalization |
|----|---------------|--------------|
| 0  | none          | 0 dB         |
| 1  | 1             | -0.64 dB     |
| 2  | 2             | -1.39 dB     |
| 3  | 2, 1          | -2.15 dB     |
| 4  | 3b            | -2.33 dB     |
| 5  | 3a            | -2.62 dB     |
| 6  | 3c            | -2.91 dB     |
| 7  | 3b, 1         | -3.18 dB     |
| 8  | 3a, 1         | -3.50 dB     |
| 9  | 3c, 1         | -3.82 dB     |
| 10 | 3b, 2         | -4.20 dB     |
| 11 | 3a, 2         | -4.56 dB     |
| 12 | 3c, 2         | -4.93 dB     |
| 13 | 3b, 2, 1      | -5.27 dB     |
| 14 | 3a, 2, 1      | -5.67 dB     |
| 15 | 3a, 3b        | -5.95 dB     |
| 16 | 3c, 2, 1      | -6.09 dB     |
| 17 | 3b, 3c        | -6.38 dB     |
| 18 | 3a, 3c        | -6.84 dB     |
| 19 | 3a, 3b, 1     | -7.27 dB     |
| 20 | 3b, 3c, 1     | -7.78 dB     |
| 21 | 3a, 3c, 1     | -8.32 dB     |
| 22 | 3a, 3b, 2     | -8.97 dB     |
| 23 | 3b, 3c, 2     | -9.59 dB     |
| 24 | 3a, 3c, 2     | -10.26 dB    |
| 25 | 3a, 3b, 2, 1  | -10.90 dB    |
| 26 | 3b, 3c, 2, 1  | -11.69 dB    |
| 27 | 3a, 3c, 2, 1  | -12.56 dB    |
| 28 | 3a, 3b, 3c    | -13.18 dB    |
| 29 | 3a, 3b, 3c, 1 | -16.60 dB    |
| 30 | 3a, 3b, 3c, 2 | -22.95 dB    |

FIG. 8B

VOLTAGE MODE TRANSMITTER EQUALIZER

RELATED APPLICATIONS

This application is the U.S. National Stage of International Application No. PCT/US2010/028871, filed Mar. 26, 2010, which designates the U.S., published in English, and claims the benefit of U.S. Provisional Application No. 61/164,354, filed on Mar. 27, 2009, and U.S. Provisional Application No. 61/242,319, filed on Sep. 14, 2009. The entire teachings of the above applications are incorporated herein by reference.

BACKGROUND

The present disclosure relates to a voltage-mode transmitter equalizer (TxEQ).

A transmitter passes output signals to a receiver over a channel or signal path such as one or more transmission lines. The transmitter may include equalization to pre-compensate for data-dependent distortion in the signal as it propagates along the transmission line. A transmitter including equalization is often called a "transmitter equalizer" or an "equalizing transmitter."

Transmitters can be classified as current mode or voltage mode. Current mode transmitters typically have separate devices for controlling the output signals and for providing impedance matching with the impedance of the transmission line(s). Thus, it is easier to control these factors in current mode transmitters. In a current-mode transmitter equalizer, an output stage of the transmitter is driven by logic that computes an appropriate output signal level (i.e., output voltage) for each bit of data to be transmitted, depending upon a data pattern formed by a sequence of digital values (data bits) to be transmitted by the transmitter, including a current data bit to be transmitted and any number of previous and/or possibly post data bits that have and/or will be transmitted. With separate devices for controlling the output level and for providing impedance matching with the impedance of the transmission line, it is relatively straightforward for a current-mode transmitter equalizer to control these factors. Conventional current mode transmitters, however, are not particularly efficient because they normally extract a power supply current that is four times the signaling current delivered to the transmission line(s).

A voltage-mode transmitter generates an output voltage that is controlled to produce a net voltage swing across a load resistance corresponding to an input signal. In contrast to current-mode transmitters, voltage-mode transmitters are able to deliver the entire power supply current to a transmission line because a single mechanism or circuit component is typically used to control both the output signal level and to provide impedance matching.

BRIEF DESCRIPTION OF THE DRAWINGS

The teachings of the embodiments can be readily understood by considering the following detailed description in conjunction with the accompanying drawings.

FIG. 8B is a table illustrating the equalization settings obtained by a driver incorporating the pull-up converter of FIG. 8A.

DETAILED DESCRIPTION OF EMBODIMENTS

Figure 1:
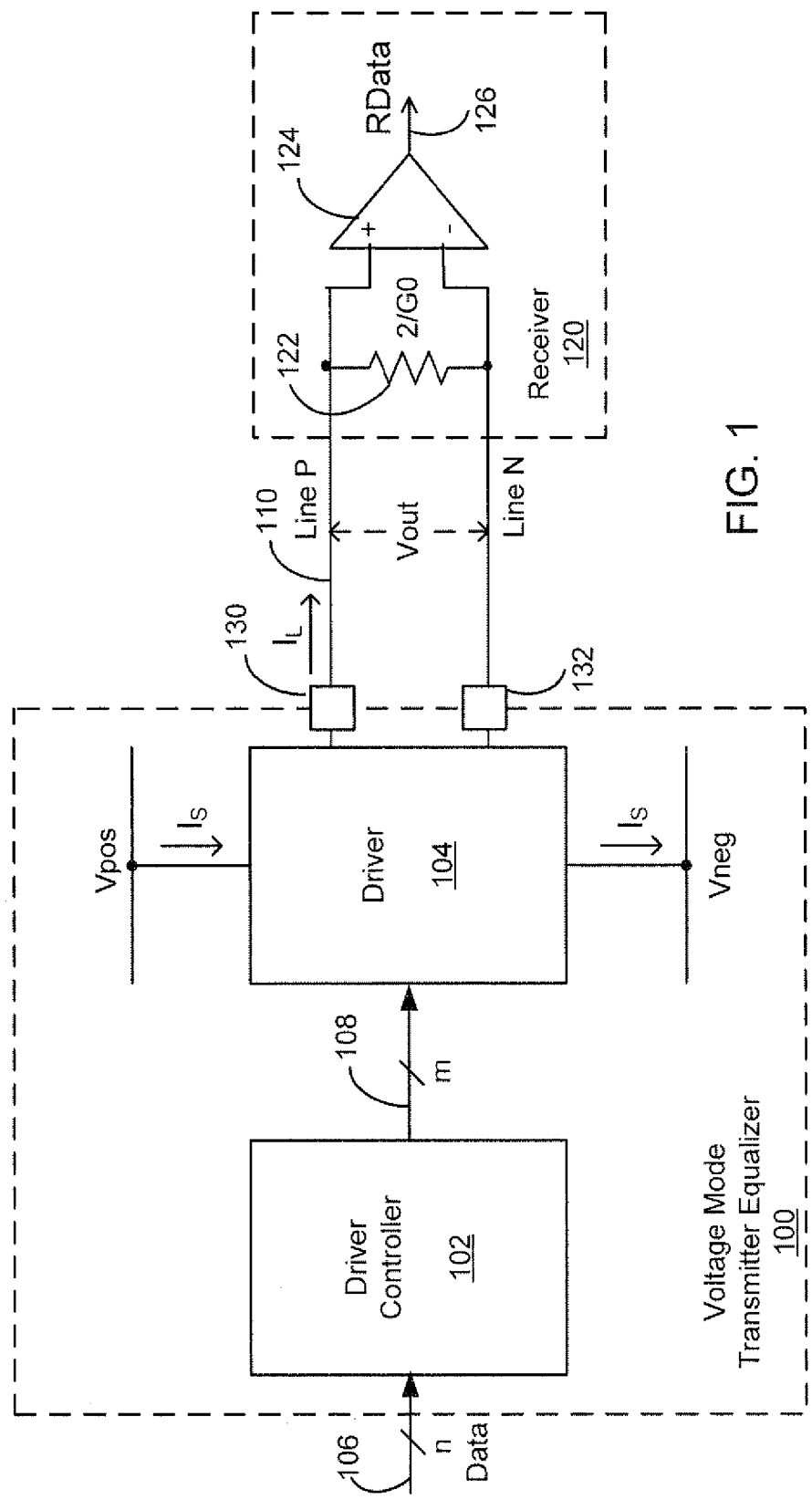
FIG. 1 illustrates a voltage mode transmitter equalizer, according to one embodiment.

Voltage mode transmitters are able to deliver the entire power supply current to a transmission line because a single mechanism or circuit component is typically used to control both the output signal level and to provide impedance matching. A conventional voltage mode transmitter, however, draws a supply current from the power supply that varies with the output signal level. For example, in some conventional voltage mode transmitter equalizers, the supply current may vary by a factor of 2 or more depending on the data pattern for equalization. The variation in supply current is due to the signaling supply voltage being split between two series impedances, whose Thevenin equivalent output impedance remains at the characteristic impedance of the transmission line for proper back-termination, while delivering a varying output voltage. The "shunt" current that flows through the series impedances does not contribute to line current, and thus increases power dissipation and lowers efficiency. This data dependent supply current may cause signal and system level performance degradation by introducing signal-switching noise (SSN) and supply voltage fluctuations.

Example embodiments of the present disclosure include a voltage mode transmitter equalizer that has high efficiencies, yet consumes substantially constant supply current from the power supply and provides constant back-match impedance (i.e., constant, return impedance). In one embodiment, the voltage mode transmitter equalizer is configured such that the output voltage of the signal to be output to the transmission lines can be controlled according to the input data, while its return impedance is held substantially matched to an impedance associated with the transmission lines, and it draws a substantially constant supply current from the power supply. In some implementations, the supply current can be kept substantially constant no matter how much equalization is applied to an output signal. In other implementations, depending on an amount of equalization applied to the output signal, there can be some data dependent variation in the supply current, but the variation is not nearly as large as those in prior art voltage-mode transmitter equalizers. Furthermore, the supply current is substantially equal to the line current on the transmission lines when the output voltage of the signal to be output on the transmission lines is at its maximum, or when no equalization is applied. As a result, the voltage mode transmitter equalizer has the benefits commonly found in current mode transmitter equalizers, despite being a voltage mode transmitter, while retaining the benefits of a voltage mode transmitter equalizer of being more power-efficient than a current mode transmitter equalizer.

Further embodiments of the present disclosure include a voltage mode transmitter equalizer that provides a fine granularity of equalization settings. In one embodiment, the voltage mode transmitter equalizer is configured such that an output voltage may be controlled, based on received input data, by dynamically varying resistance values of a pull-up circuit and a pull-down circuit coupled to the transmission lines. The pull-up and pull-down circuits may each include a plurality of conductance channels, and the resistance values of the pull-up and pull-down circuits may be varied by enabling and disabling selected ones of a plurality of conductance channels.

Embodiments of the present disclosure may include a fine-granularity voltage-mode transmitter equalizer that has high efficiencies, yet consumes substantially constant supply current from the power supply and provides constant back-match impedance (i.e., constant return impedance). In one embodiment, the voltage mode transmitter equalizer is configured such that the output voltage of the signal to be output to the transmission lines can be controlled according to the input data, while its return impedance is held substantially matched to an impedance associated with the transmission lines, and it draws a substantially constant supply current from the power supply. In some implementations, the supply current can be kept substantially constant no matter how much equalization is applied to an output signal.

In other implementations, depending on an amount of equalization applied to the output signal, there can be some data dependent variation in the supply current, but the variation is not nearly as large as those in prior art voltage-mode transmitter equalizers. Furthermore, the supply current is substantially equal to the line current on the transmission lines when the output voltage of the signal to be output on the transmission lines is at its maximum, or when no equalization is applied. As a result, the voltage mode transmitter equalizer has the benefits commonly found in current mode transmitter equalizers, despite being a voltage mode transmitter, while retaining the benefits of a voltage mode transmitter equalizer of being more power efficient than a current mode transmitter equalizer.

FIG. 1 illustrates a voltage mode transmitter equalizer (hereinafter, "V-mode Tx EQ"), according to one embodiment. In one embodiment, V-mode Tx EQ 100 may be part of an integrated circuit built on a semiconductor substrate. V-mode Tx EQ 100 includes a driver controller 102 and a driver 104. The integrated circuit may be a memory device, memory controller, or any other IC that communicates digital data with another IC. Driver controller 102 receives in parallel a sequence of n bits of data (Data 106) and generates one or more control signals 108 for controlling a signal level for transmitting a current data bit. Based on the control signal(s) 108, driver 104 drives a signaling current IL onto a differential transmission line 110 via its output terminals (output pins or output pads) 130, 132 of the integrated circuit. The transmission line 110 may be differential and is composed of two coupled wires Line P and Line N. Each of these wires has an odd-mode (differential-mode) real characteristic impedance of $R0=1/G0$, so a differential impedance associated with the differential-pair 2-wire transmission line is about $2 \times R0=2/G0$. Transmission line 110 is terminated by termination resistor 122 in a receiver 120. Termination resistor 122 has an impedance nominally equal to the differential impedance of differential transmission line 110, namely $2/G0$. The voltage developed across termination resistor 122 is $Vout=2IL/G0$. This voltage is detected by a receiver circuit (e.g., a comparator) 124 within receiver 120, and comparator 124 converts the voltage between Line P and Line N into a digital value. As a result, the receiver 120 provides a received data signal (Rdata) 126 that corresponds to the sequence of data 106 previously received at the voltage-mode transmitter equalizer 100.

The sequence of n bits of data represent a sequence of digital values to be transmitted from transmitter 100 over transmission line 110 to receiver 120. The n bits might represent, for example, a data bit to be transmitted at a particular time, and the (n−1) previous bits that have been previously transmitted. The n-bit digital data 106 includes at least a current bit of data to be transmitted over the transmission lines and other bits such as previous bits that are transmitted prior to the transmission of the current bit and/or post bits that are transmitted subsequent to the transmission of the current bit. This collection of n bits of data is used to determine a proper equalization constant for the bit presently being transmitted. Based on the n-bit digital data 106, driver controller 102 generates control signal(s) 108 for controlling driver 104. Driver 104 is coupled to supply voltages Vpos and Vneg, which may come directly from a power supply or through one or more regulators (not shown). The voltage between these two supply voltages is $Vs=Vpos-Vneg$. Under control of the control signals 108, driver 104 generates the properly equalized output voltage Vout for the output signal for transmission over transmission lines 110 (Lines P and N). An absolute value of the output voltage Vout is a fraction of a maximum signaling voltage Vmax, which in some embodiments is about equal to a supply voltage, i.e., $|Vout|=|A| \times Vmax$ ($0 \leq |A| \leq 1$), where A is the desired output factor ($-1 \leq A \leq 1$) and $|A|$ is the equalization constant (absolute value of A) and Vmax in some embodiments is about half of Vs. The output factor A corresponds to the equalization setting represented by a set of parallel bits of the control signals 108, which corresponds to a data bit of input data 106.

The driver 104 may be configured such that its return impedance ($1/G_T$, where $G_T$ is the conductance of driver 104) is substantially matched to the differential impedance ($2/G0$, where G0 is the characteristic conductance of each of transmission Lines P and N) across the transmission Lines P and N, regardless of the data pattern of input data 106 and the resulting output factor A. The return impedance of driver 104 is the impedance of driver 104 measured as one looking into the driver 104 from the transmission lines 110. Also, the driver 104 may be configured to draw a supply current Is that is substantially equal to a maximum line current $I_{L, MAX}$ on transmission Lines P and N. The maximum line current $I_{L, MAX}$ is the amount of current that would flow on the transmission lines 110 when the output voltage of the transmitter equalizer 100 is at its maximum, or when the output factor A=1. The supply current may remain substantially constant regardless of the signal level on the transmission line 110. Thus, in one embodiment, the supply current Is when the equalization constant is at its maximum (e.g., output factor is +1 or −1) is substantially equal to the supply current Is when the equalization constant |A| is at its minimum |A| (e.g., output factor A is 0), or when the equalization constant |A| has any value between 0 and 1. As a result, further embodiments of a V-mode Tx EQ 100 has the benefits commonly found in current mode transmitter equalizers, despite being a voltage mode transmitter equalizer. In addition, Vmode Tx EQ 100 still retains the advantages of a voltage mode Tx EQ of being more power-efficient than a current mode transmitter equalizer.

The driver 104 may be configured to equalize the output current $I_L$, which in turn varies the voltage generated at the termination resistor 122 at the receiver 120. Such equalization adjusts the attenuation of output current $I_L$, and may compensate for attenuation occurring outside of the voltage-mode transmitter. Moreover, the receiver 120 may require specific equalization settings for compliance with a particular communications protocol (e.g., PCIe Gen2). The driver 104 provides fine granularity equalization so as to enable accurate attenuation at one or more levels, and can be configured to provide further equalization settings as desired.

In one embodiment, the driver controller 102 may include logic and/or a lookup table to determine an output signal level (or equalization setting) for transmitting each data bit onto the transmission lines based on a plurality of data bits. The plurality of data bits may include a current data bit to be transmitted over the transmission lines and other bits, such as one or more preceding data bits (pre-bits) that are transmitted prior to the transmission of the current bit and/or one or more succeeding data bits (post-bits) that are transmitted after the transmission of the current bit. The equalization setting for each data bit to be transmitted is represented by a set of parallel bits of the control signal(s) 108. The pre-bits and/or post-bits used to determine the equalization setting of a data bit are referred to as equalization taps. With one equalization tap, the logic to control the output may be included in a pre-driver (not shown), bypassing the need for a look-up table or more complex control mechanism. The description below, in particular with reference to FIGS. 7A-8C, provides further disclosure of such further embodiments providing a voltage-mode transmitter equalizer having fine-granularity equalization and constant supply current.

Figure 2A:
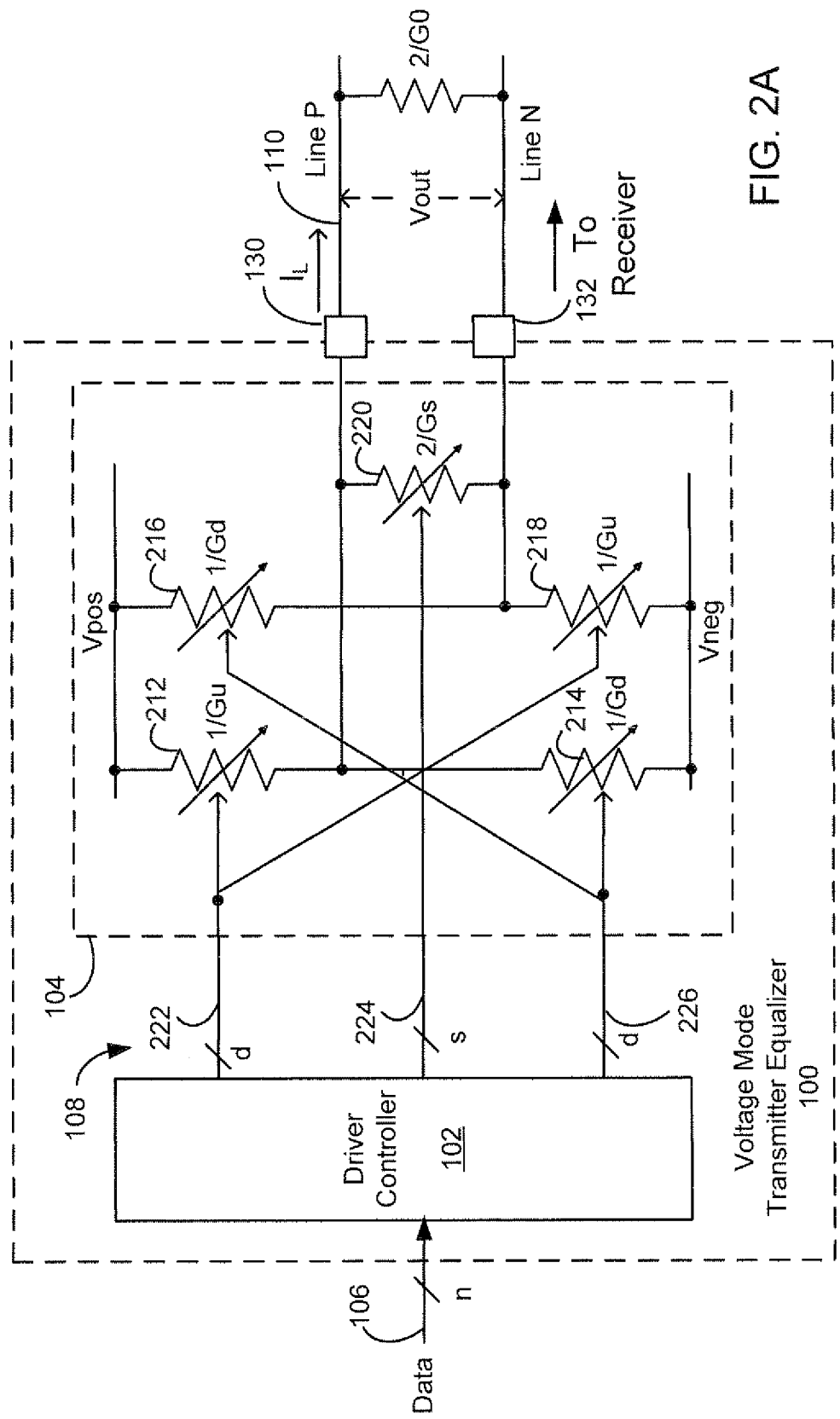
FIG. 2A illustrates a specific implementation of the voltage mode transmitter equalizer in FIG. 1.

FIG. 2A illustrates one implementation of driver 104, according to one embodiment. As shown in FIG. 2A, control signal(s) 108 includes control signals 222, 224, 226 for controlling driver 104. Control signals 222 and 226 are each d-bits wide, and control signal 224 is s-bits wide. Here, d and s each represent an integer equal or greater than 1.

In one embodiment, driver 104 includes variable conductances 212, 218 with variable conductance value Gu, variable conductances 216, 214 with variable conductance value Gd, and variable shunt conductance 220 with variable conductance value Gs/2. Variable shunt conductance 220 may be implemented as two separate conductances connected in series, with each conductance having conductance value Gs or as one conductance having conductance value Gs/2. The conductance of variable conductances 212, 218 is adjusted by control signal 222, the conductance of variable conductances 216, 214 is controlled by control signal 226, and the conductance of variable shunt conductance 220 is controlled by control signal 224. For example, when control signal 222 is at its maximum (all "1"s), conductances 212, 218 would be at their maximum. When control signal 222 is at its minimum (all "0"s), conductances 212, 218 would be at their minimum. And, when control signal 222 is between its minimum and maximum, conductances 212, 218 would have conductances between their minimum and maximum. Other variable conductances 216, 214, 220 are controlled similarly according to their corresponding control signals 226, 224. Conductances 212 and 216 are sometimes referred to as pull-up conductances, while conductances 214 and 218 are sometimes referred to as pull-down conductances. Driver 104 can be considered as including a P-driver formed by pull-up conductance 212 and pull-down conductance 214, and a N-driver formed by pull-up conductance 216 and pull-down conductance 218.

Control signals 222, 224, 226 adjust the conductances 212, 218, conductances 216, 214, and shunt conductance 220 such that the total impedance of driver 104 (1/GT), measured between its two output terminals 130, 132, is matched to the differential impedance of the differential transmission line formed by Lines P and N (i.e., 2/G0, where G0 is the characteristic conductance of each of Lines P and N), regardless of the data pattern of input data 106 and the resulting output factor A. Specifically, control signals 222, 224, 226 are generated to adjust conductances 212, 218, conductances 216, 214, and shunt conductance 220 such that they each have a predetermined relation with the equalization constant |A|. In an ideal implementation, conductances 212, 218, conductances 216, 214, and shunt conductance 220 are related to each other and to the equalization constant |A| at least approximately in accordance with the following Equations 1, 2, and 3. These equations serve as a guide when driver 104 is being implemented. Deviation from these equations can occur, however, depending on specific implementations, as discussed below.

$$Gu = \frac{G0(1+A)^2}{4} \quad \text{Equation 1}$$

$$Gd = \frac{G0(1-A)^2}{4} \quad \text{Equation 2}$$

$$Gs = \frac{G0(1+A)(1-A)}{2}. \quad \text{Equation 3}$$

The values of control signals 222, 224, 226 are generally computed using the above Equations 1, 2, and 3, up to the bit precision necessary for a corresponding acceptable error (tolerance). The required output factor A is determined based on the data pattern of a set of data bits 106. The number of data bits in the input data 106 used to determine the output factor A is equivalent to the number of "taps" of the digital filter implemented in the v-mode transmitter equalizer 200. For example, 3 bits of precision may be required for output factor A (i.e., 8 steps in output factor A). To achieve this resolution, 5 bits of precision may be used for each of conductances 212, 218, 216, 214, and 4 bits for shunt conductance 220 (i.e., s=4, d=5).

When conductances 212, 218, 216, 214, and shunt conductance 220 are adjusted in this manner, driver 104 draws supply current IS that is substantially equal to the maximum line current IL, MAX on transmission Lines P and N, regardless of the data pattern of input data 106 and the resulting output factor A. Thus, driver 104 has minimal variation in the supply current IS, regardless of the data pattern of input data 106 and the resulting output factor A. For example, if 3 bits of precision are needed for output factor A (i.e., 8 steps in output factor A), and 5 bits (d=5) of precision are used for each of the conductances 212, 218, 216, 214, and 4 bits (s=4) of precision for shunt conductances 220, a data-dependent variation in the supply current between Vpos and Vneg may be about 7%, or less than 10%. Here, the data-dependent variation in the supply current is defined as (IS,MAX−IS,MIN)/IS,MAX, where IS,MAX corresponds to a maximum IS value, which usually occurs when no equalization is applied, and where IS,MIN corresponds to a minimum IS value which occurs when certain amount of equalization is applied.

In this regard, note that the variable shunt conductance 220, with its conductance controlled as explained above, enables the driver 104 to have reduced, uniform supply current IS between Vpos and Vneg. With addition of the variable shunt conductance 220, the supply current IS between the power supplies Vpos, Vneg is significantly reduced, compared with conventional voltage-mode transmitter equalizers and has minimal variation (is substantially constant).

Figure 2B:
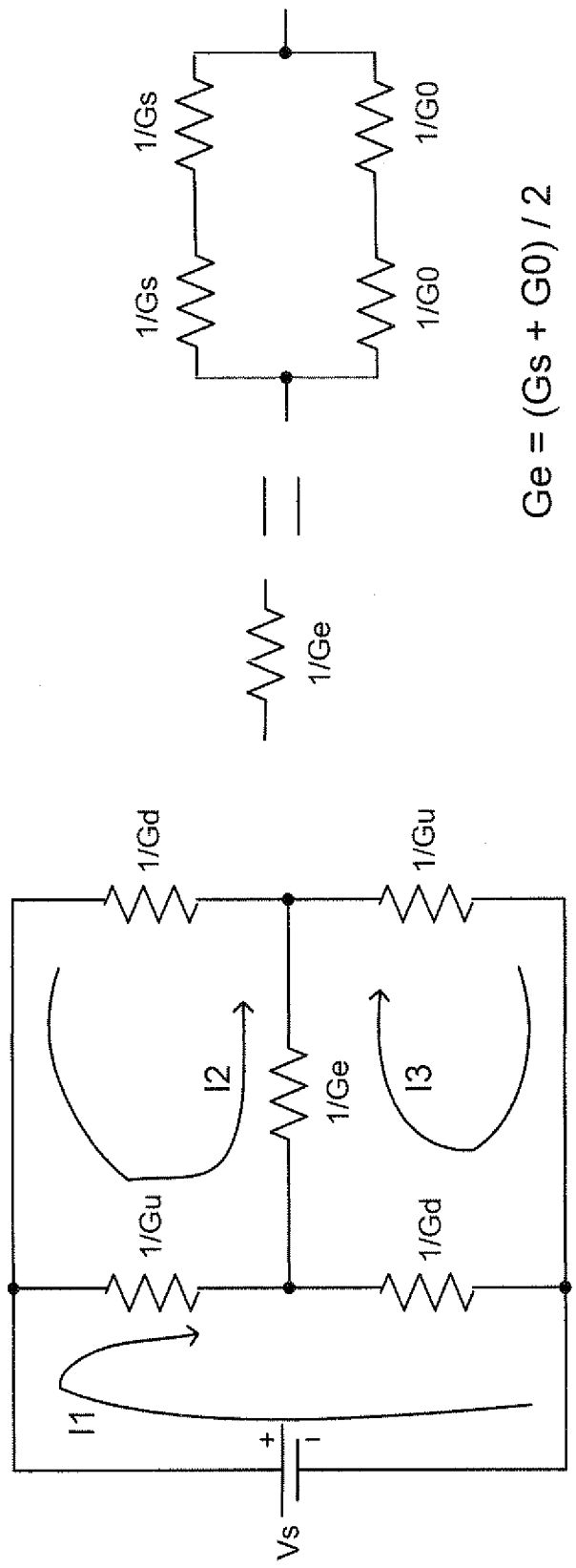
FIG. 2B illustrates an equivalent circuitry of a driver and transmission lines in the voltage mode transmitter equalizer of FIG. 2A.

FIG. 2B illustrates an equivalent circuitry of the driver 104 and transmission lines 110 shown in FIG. 2A. FIG. 2B also illustrates how Equations 1, 2, 3 above are derived. Note that the shunt conductance 220 (with conductance value Gs/2) is shown split as a pair of shunt conductances ("split shunt conductances") each having conductance value Gs in FIG. 2B. Further, the combination of the split shunt conductances Gs in parallel with the line conductances G0 is represented as the equivalent conductance Ge, as shown in FIG. 2B. Current I1, I2, I3 and the supply voltage Vs are also illustrated in FIG. 2B. The mesh equations for this equivalent circuit are:

$$(I1+I2)/Gu+(I1-I3)/Gd=Vs \quad \text{Equation 4}$$

$$(I1+I2)/Gu+(I2+I3)/Ge+I2/Gd=0 \quad \text{Equation 5}$$

$$(I3-I1)/Gd+(I2+I3)/Ge+I3/Gu=0 \quad \text{Equation 6}$$

$$\text{where,} \quad Ge=\frac{Gs+G0}{2}. \quad \text{Equation 7}$$

Solving the mesh equations for I1, I2, I3 results in:

$$I1=Vs\frac{(Gu+Gd)(G0+Gs)+4GuGd}{2(G0+Gs+Gu+Gd)} \quad \text{Equation 8}$$

$$I2=-Vs\frac{Gd(G0+Gs+2Gu)}{2(G0+Gs+Gu+Gd)} \quad \text{Equation 9}$$

$$I3=Vs\frac{Gu(G0+Gs+2Gd)}{2(G0+Gs+Gu+Gd)} \quad \text{Equation 10}$$

The attenuation constant can be found by noting that current I2+I3 flows through conductance Ge:

$$V_{out}=\frac{I2+I3}{Ge}=Vs\frac{Gu-Gd}{G0+Gs+Gu+Gd} \quad \text{Equation 11}$$

$$A=\frac{2(Gu-Gd)}{G0+Gs+Gu+Gd} \quad \text{Equation 12}$$

In order for the transmitter to provide a correct back-match to the transmission line, the sum of the conductances of in the driver should equal the line conductance:

$$Gu+Gd+Gs=G0 \quad \text{Equation 13}$$

Also, according to the constant current condition, supply current $I_S$ drawn from the power supply should be (Vs·G0)/4, independent of the output factor A:

$$I_s=I1=Vs\frac{(Gu+Gd)(G0+Gs)+4GuGd}{2(G0+Gs+Gu+Gd)}=\frac{VsG0}{4}, \quad \text{Equation 14}$$

leading to:

$$G0(G0+Gs+Gu+Gd)=2[(Gu+Gd)(G0+Gs)+4GuGd]. \quad \text{Equation 15}$$

Solving Equation 13 for Gs in terms of G0, Gd, and Gu, and inserting the result into Equation 15, a quadratic equation for Gd in terms of Gu, G0 is obtained:

$$Gd^2+Gd[2(Gu+G0)]+(Gu^2+G0^2-2GuG0)=0 \quad \text{Equation 16}$$

$$Gd=G0+Gu\pm2\sqrt{GuG0}. \quad \text{Equation 17}$$

Choosing the negative root in Equation 17 and inserting Gd into Equation 13, the following solution for Gs is obtained:

$$Gs=-2Gu+2\sqrt{GuG0} \quad \text{Equation 18.}$$

Inserting Gd, Gs of Equations 17 and 18 into Equation 12, we can solve for Gu, then find Gd, Gs by substitution into the above Equations 17 and 18 to obtain the conditions as stated above in Equations 1, 2, and 3.

Figure 2C:
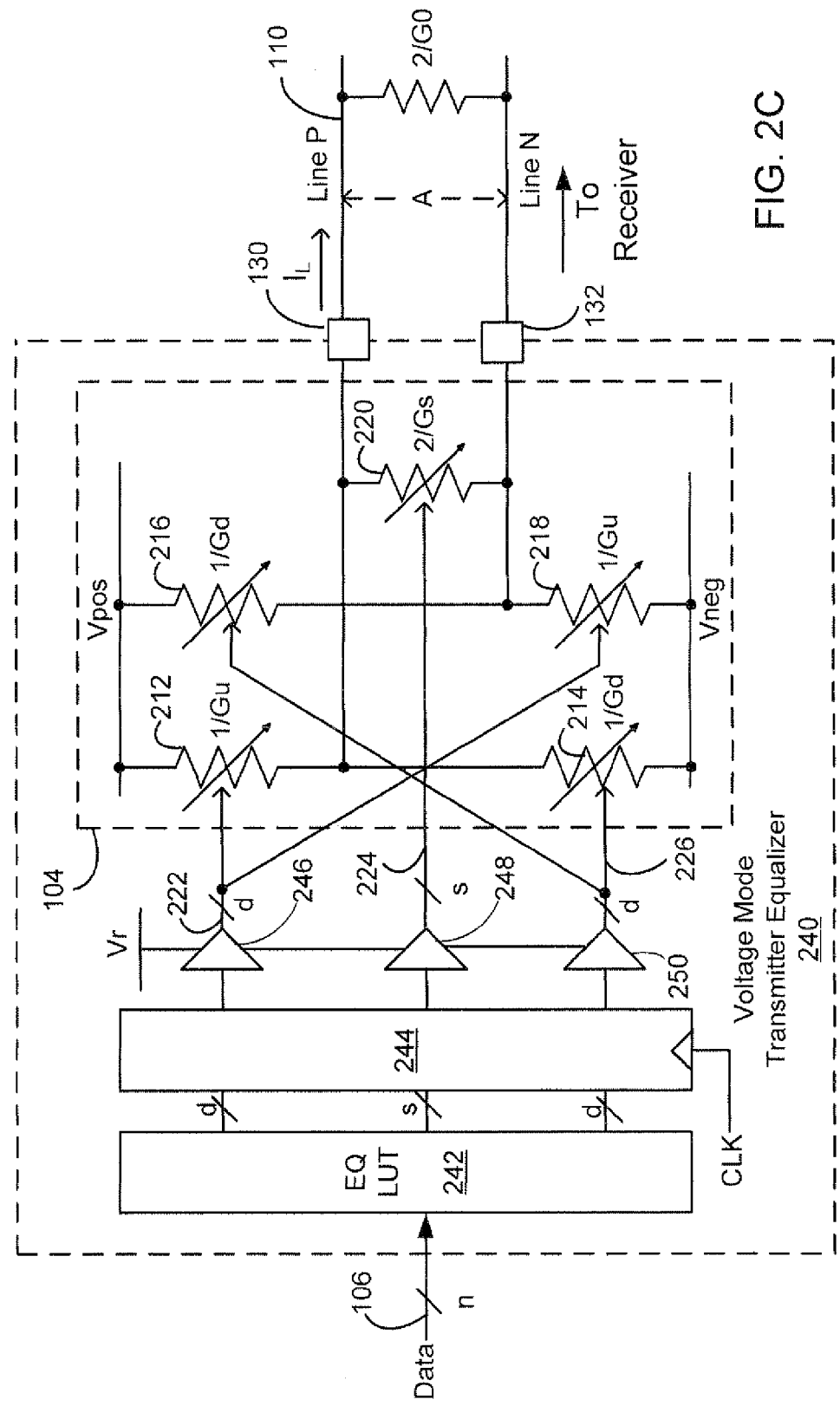
FIG. 2C illustrates a voltage mode transmitter equalizer using analog impedance control, according to still another embodiment.
Figure 2D:
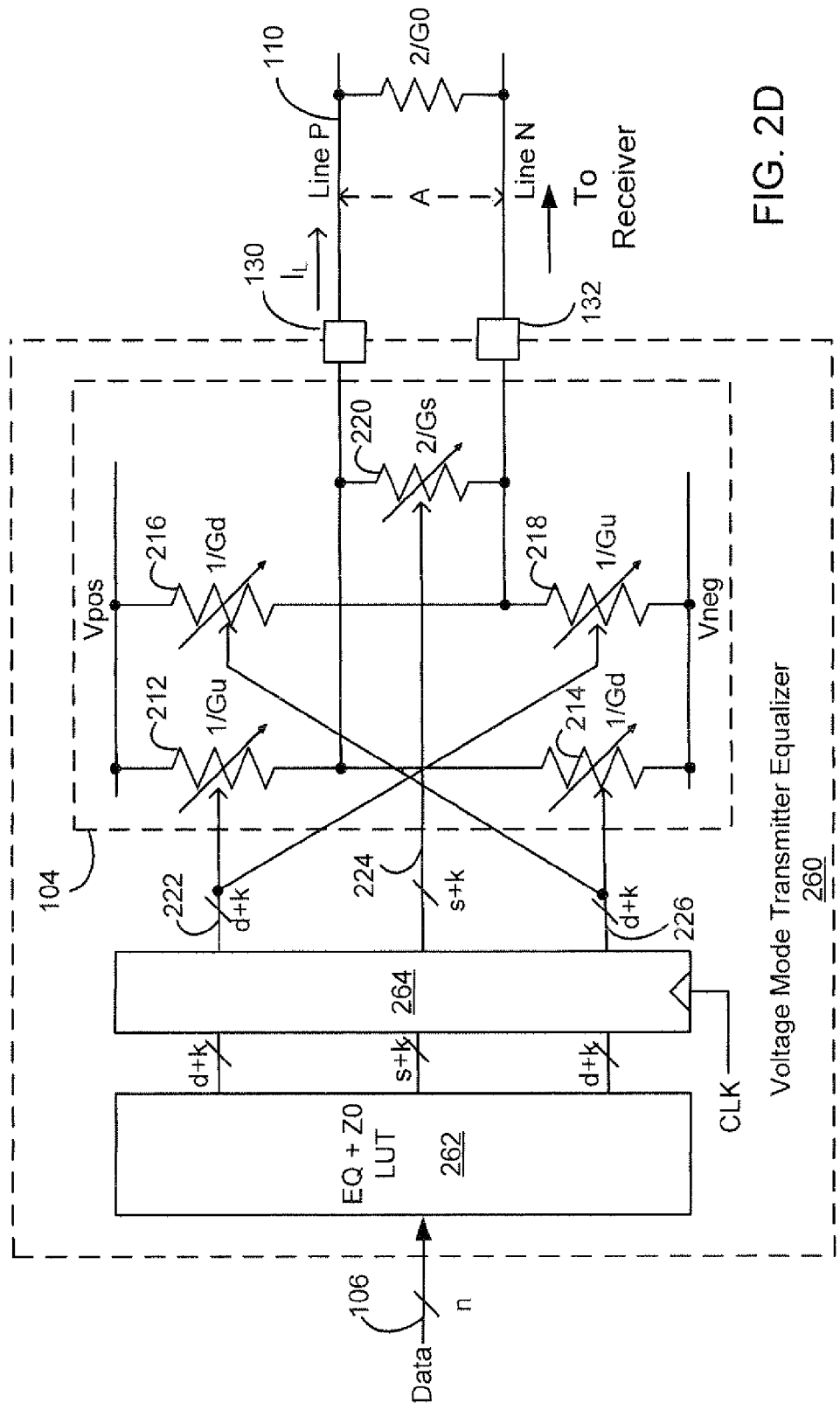
FIG. 2D illustrates a voltage mode transmitter equalizer using digital impedance control, according to still another embodiment.
Figure 3A:
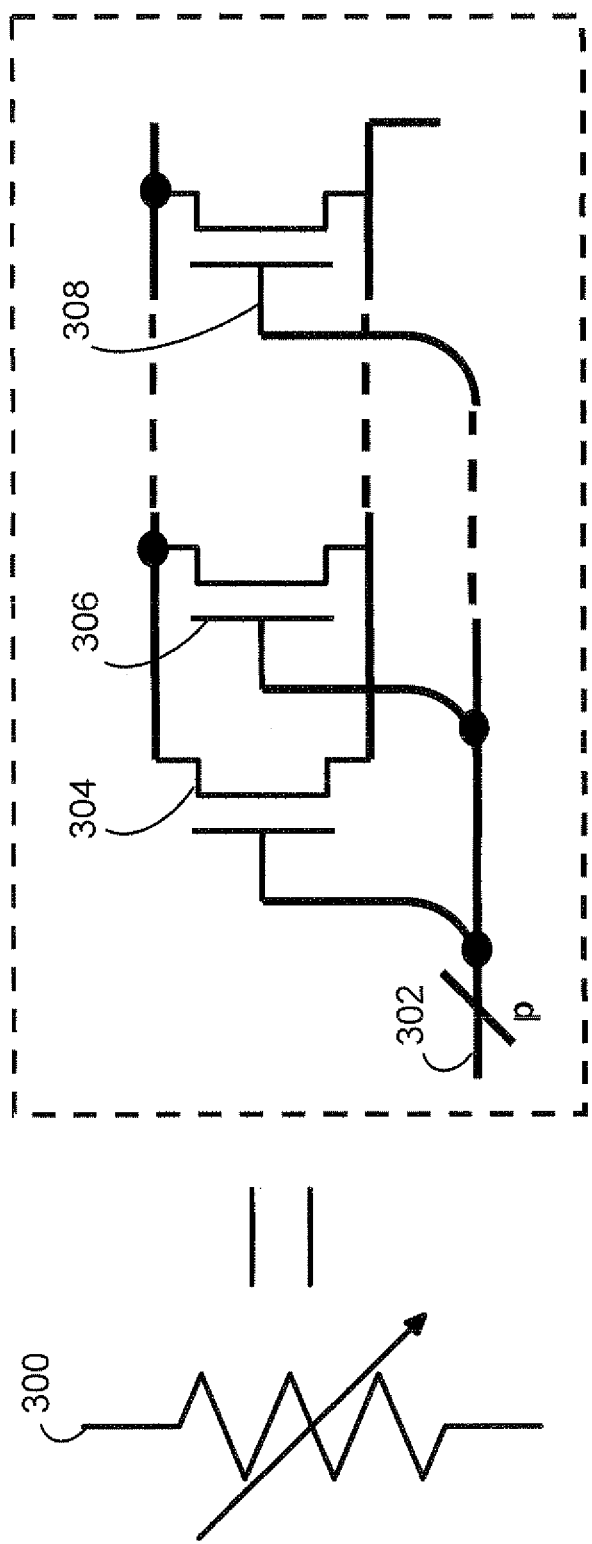
FIG. 3A illustrates example circuitry of the variable resistor used in the voltage mode transmitter equalizer embodiments of FIGS. 2A, 2C, and 2D, according to one embodiment.

An example of the circuitry of the variable conductance (variable resistor) that can be used in the voltage mode transmitter equalizer embodiment of FIG. 2A (and also FIGS. 2C, and 2D to be described below) according to one embodiment is illustrated in FIG. 3A. Referring to FIG. 3A, any one of the variable conductances 212, 218, 216, 214, and 220 may be implemented as variable conductance 300.

As shown in FIG. 3A, the variable conductance 300 can be implemented with a plurality of identical (or scaled) MOSFETs 304, 306, . . . , 308 (p number of MOSFETs in this example) connected to each other in parallel, controlled by a p-bit control signal 302. Each bit of the control signal 302 controls the on or off state (and thus the conductance) of a corresponding one of MOSFETs 304, 306, . . . , 308. Thus, the total conductance of variable conductance 300 may be adjusted according to how many of the MOSFETs 304, 306, 308 are turned on, responsive to the p-bit control signal 302. The total conductance of variable conductance 300 increases as a larger number of the MOSFETs 304, 306, 308 are turned on responsive to control signal 302. In the embodiment of FIG. 3A, the MOSFETs that form each conductance perform two functions in a single device, forming both a switch, responsive to one of control signals 302, and a conductance formed by the ON-state drain conductance of the MOSFET. In this embodiment, the MOSFET is assumed to be operating in the "linear" or "triode" mode of operation, in which the drain current is linearly related to the voltage between the drain and source of the device.

Figure 3B:
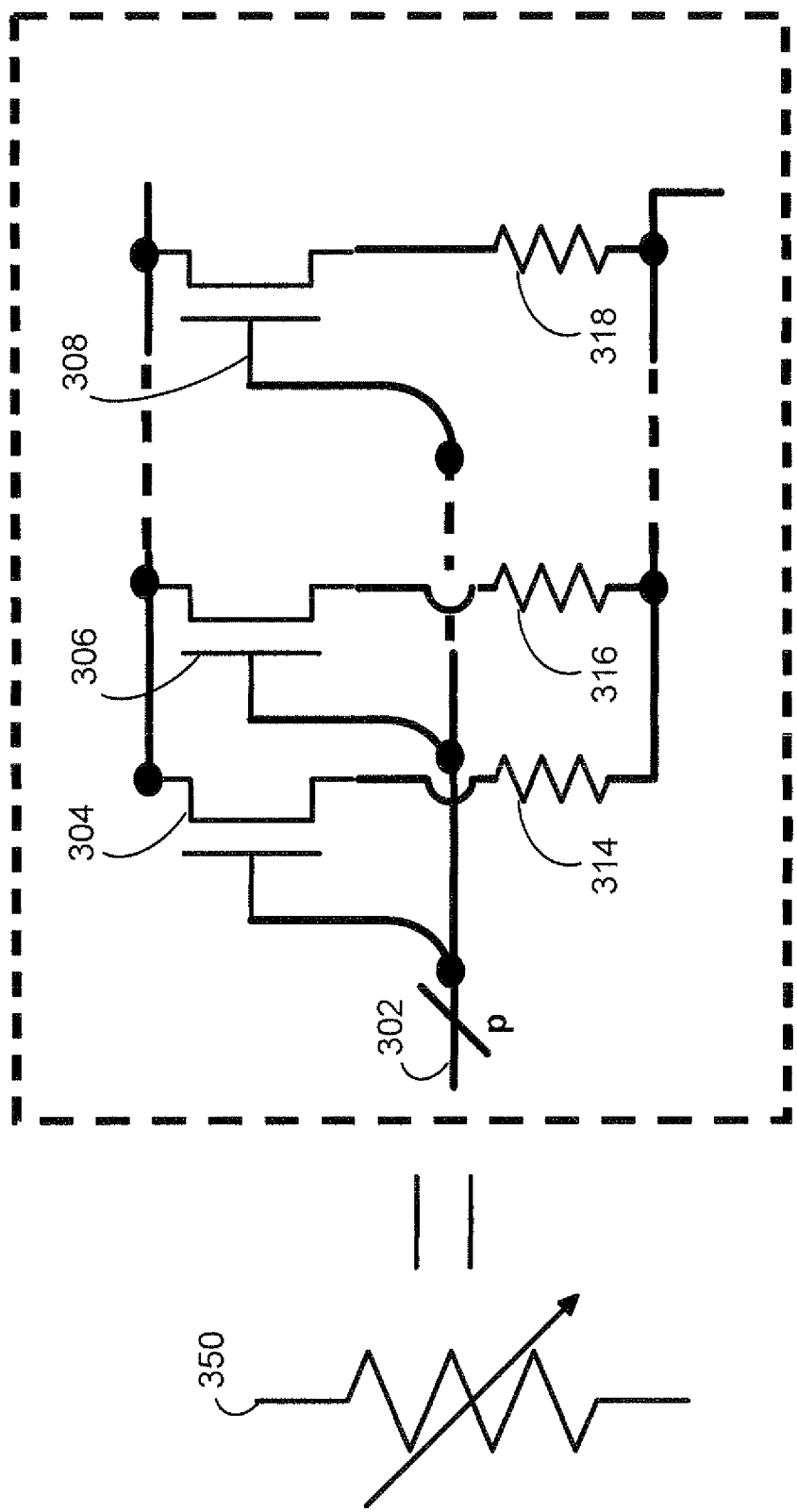
FIG. 3B illustrates example circuitry of the variable resistor used in the voltage mode transmitter equalizer embodiments of FIGS. 2A, 2C, and 2D, according to another embodiment.

Although FIG. 3A shows one example of how the variable conductance can be implemented, a variety of other implementations are also possible to achieve the similar function of adjustable conductance responsive to control signal 302. For example, in an embodiment illustrated in FIG. 3B, each of the conductances 350 is formed by a series combination of a MOSFET (304, for example) and a resistor (314, for example), so that the total resistance of that element is the sum of the resistance of the resistor 314 and the ON-state drain resistance of the MOSFET 304. Other series combinations of the MOSFET and resistor, i.e., MOSFET 306 with resistor 316, and MOSFET 308 with resistor 318, are also shown in FIG. 3B. N-type MOSFETs (NFETs) are shown by way of example, but P-type MOSFETs (PFETs) may be used in other embodiments. The relative resistances of the MOSFET 304, 306, 308 and resistor 314, 316, 318 in each conductance element can be chosen at will. In some embodiments, for example, the shape-factor (width/length) of the MOSFET 304, 306, 308 may be chosen to be sufficiently large that the ON-state resistance of the MOSFET 304, 306, 308 is negligible with respect to the associated resistor 314, 316, 318. In this case, the overall conductance of the element is almost entirely determined by the resistor 314, 316, 318, and the MOSFET 304, 306, 308 acts essentially as an ideal switch. In other embodiments, the resistor may be left out entirely, as shown in FIG. 3A. In still other embodiments, resistors may be connected in series with both the source and drain terminals of their associated MOSFETs to form a symmetric structure; such an embodiment would be particularly useful for implementing the shunt conductance 220 of the voltage mode transmitter equalizer.

Again referring to FIG. 3B, the relative shape factors of the MOSFETs, 304, 306, 308, for example, as well as the resistance of the resistors 314, 316, 318, for example, may be chosen to be substantially equal, in which case the p control signals 302 form a "thermometer code", each bit of which controls an equal increment of conductance. Alternatively, the relative sizes of MOSFETs 304, 306, 308 and resistors 314, 316, 318 may be scaled in some way. In some embodiments, the scaling may be binary weighted, so that, for example, MOSFET 306 has a shape factor 2× as large as MOSFET 304, while resistor 316 has half the resistance of 314, and so forth, thus forming a binary-weighted array of switchable conductances. In other embodiments, the MOSFET shape factors and resistances may be tapered in other ways.

FIG. 2C illustrates a voltage mode transmitter equalizer using analog impedance control, according to another embodiment. As explained with reference to FIGS. 3A and 3B above, the variable conductances, 212, 218, 216, 214, 220 may be implemented with MOSFETs whose impedance change with the voltage applied between the gate and source of the devices. The impedance of such MOSFETs may vary (be non-uniform) due to temperature changes, fabrication process variations, etc. Therefore, even if the pre-calculated values of Gu, Gd, Gs theoretically should result in matched impedance of the driver 104 and the transmission line formed by Lines P, N, it may be necessary to compensate for the variation in the impedance of the MOSFETs that make up the conductances in actual implementation. The voltage mode transmitter equalizer of FIG. 2C is an example of analog control (fine tuning) of the impedance of driver 104.

V-mode Tx EQ 240 includes an equalizer look-up table (EQ LUT) 242, a clocked latch 244, buffer drivers 246, 248, 250, and the variable conductance driver 104. LUT 242, latch 244, and the buffer drivers 246, 248, 260 form the driver controller 202 in the embodiment of FIG. 2A, and variable conductance driver 104 is same as that shown in the embodiment of FIG. 2A. As can be seen from above, the conductances values Gu, Gd, and Gs needed for all possible values of the output factor A can be calculated according to Equation 1, Equation 2, and Equation 3. Then, depending upon the configuration of the variable conductances 212, 218, 216, 214, 220, the d-bit values of control signals 222 and 226, and the s-bit value of control signal 226 needed to obtain such pre-calculated conductances values Gu, Gd, and Gs for the various values of output factor A can be determined. Such values of the control signals 222, 224, 226 are pre-determined and stored in EQ LUT 242. The relationship between the input data pattern 106 and the corresponding output factor A needed on the transmission Lines P, N, is known in the art and can be used to determine at which location (index) of LUT 242 to store the control signal values 222, 224, 226. LUT 242 receives the n-bit input digital data 106 for transmission over the differential transmission line (Lines P and N). Using n-bit digital data 106 as an index into LUT 242, LUT 242 selects and outputs the appropriate control signals 222, 224, 226 according to the n-bit input digital data 106. The s-bit and d-bit values of the control signals 222, 224, 226 are temporarily stored in clocked latch 244, and are input via buffer drivers 246, 248, 250 to driver 104 to adjust the variable conductances 212, 218, 214, and 216, and the variable shunt conductance 220, as explained above with reference to FIG. 2A. Note that although a look-up table 242 is used in the embodiment herein to output the appropriate values of control signals 222, 224, 226 in response to the input data pattern 106, the look-up table 242 can be replaced with logic circuitry that performs similar functions of generating (via the logic circuitry) the appropriate values of control signals 222, 224, 226 in response to the input data pattern 106.

Buffer drivers 246, 248, 250 are configured to drive voltages that toggle between 0 and Vr. In some embodiments, buffer drivers 246, 248, 250 are CMOS inverters connected between power supply terminals Vr and GND (0 volts). Referring again to FIGS. 3A and 3B, in some embodiments each of conductances 304, 306, . . . 308 should ideally be adjusted to have the identical ON-state conductances. The voltage Vr is that voltage which, when applied to the gate terminals of the MOSFETs 304, 306, . . . 308 cause the device to have the desired incremental drain conductance, namely (1/p)× the maximum conductance. In other embodiments, the conductances 304, 306, . . . 308 may be binary-weighted, each successive conductance being twice the previous one. The voltage Vr is again chosen so that the incremental conductance is (1/p)× the maximum conductance of conductance 300.

Figure 4A:
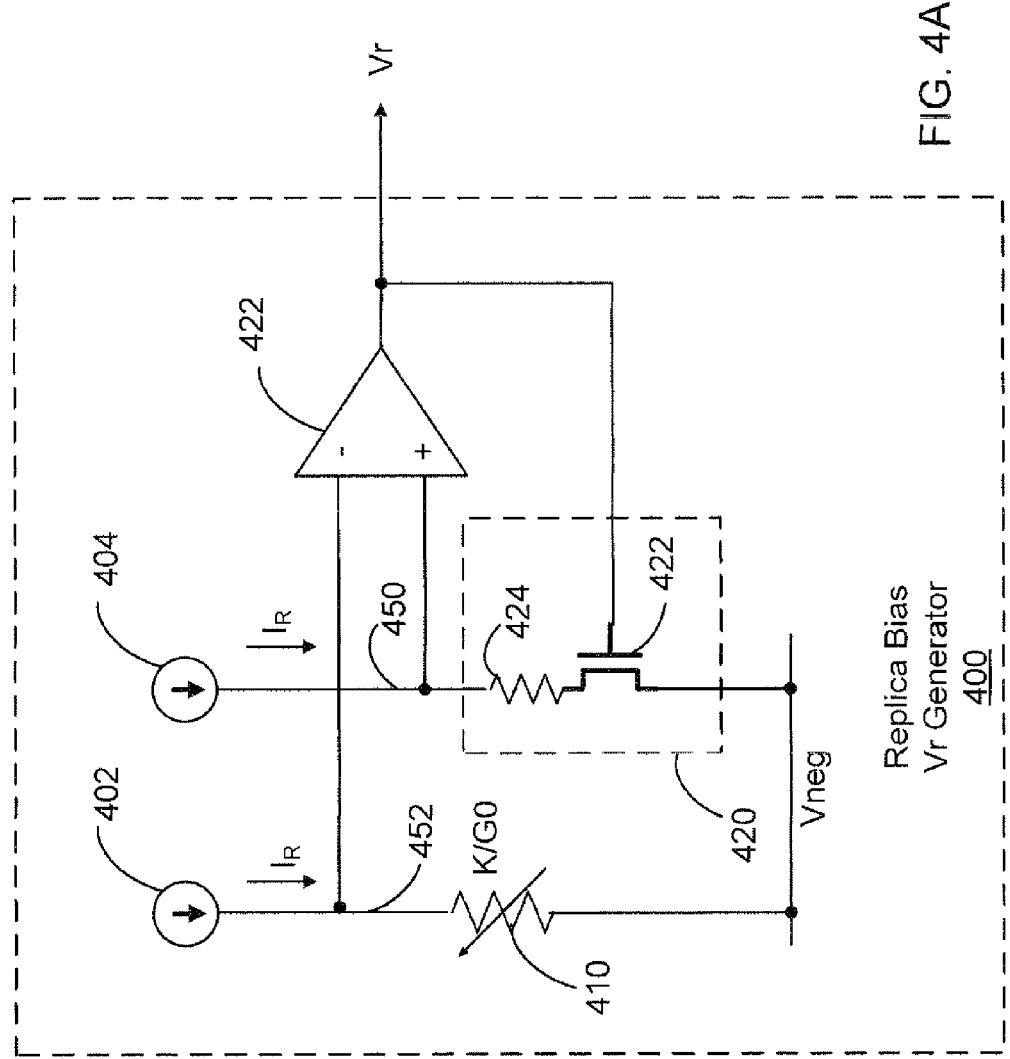
FIG. 4A illustrates a replica bias reference voltage generator for use with the voltage mode transmitter equalizer embodiment of FIG. 2C, according to one embodiment.

The impedance-control voltage Vr can be generated in many different ways. In one embodiment, shown in FIG. 4A, Vr is generated in a replica-bias circuit. Referring to FIG. 4A, replica-bias Vr generator 400 is a circuit separate from the voltage-mode equalizer 240 (in FIG. 2C). Replica-bias Vr generator 400 may provide the Vr voltage to one or more equalizers. Inside the Vr generator 400, two current sources 402, 404 generate equal currents IR. In the left branch, current IR from 402 is driven into resistor 410. This resistor 410 is adjusted to be equal to K/G0, where K is some convenient numerical factor, typically >1. The resistor 410 is therefore adjusted to K× the characteristic impedance of the lines that make up the differential transmission line (110 in FIG. 2C). IR is chosen so that a voltage of Vs/4 is developed across resistor 410. Identical current IR is driven by current source 404 into replica circuit 420, which contains a series combination of a resistor 424 and a MOSFET 422. This replica circuit 420 is intended to be substantially identical to one or more of the conductance elements in the variable conductance 350 in FIG. 3B. In some embodiments, the resistor 424 is not needed, and in that case the replica circuit 420 corresponds to one of the conductance elements 304, 306, . . . , 308 in FIG. 3A. An amplifier 422 amplifies the difference between the voltage at nodes 450 and 452 and produces voltage Vr. A feedback loop is formed by the connection of the voltage Vr output back to the gate of MOSFET 422 inside the replica circuit 420. This feedback loop forces the voltage at node 452 to be substantially equal to the voltage at node 450, and since both the resistor 410 and the replica circuit 420 carry the same current, the replica element 420 is thereby controlled so as to have the same impedance as the resistor 410. Further, since replica circuit 420 is identical to one of the conductance elements in the equalizing driver, for example conductances 214 and 218 in FIG. 2C, those conductances will have a conductance that is a multiple of the unit conductance, as required.

Still referring to FIG. 4A, the currents from current sources 402 and 404 are returned to Vneg, the same voltage as the lower supply voltage for the v-mode TxEQ. Thus the individual conductance elements that make up variable conductances 214 and 218 in driver 104 (FIG. 2C) see substantially the same biasing conditions when they are turned ON as does the device inside replica circuit 420 (FIG. 4A), and therefore conductances 214 and 218 are forced to be multiples of the conductance of replica circuit 420. Note that the voltage across conductances 214 and 218 (FIG. 2C) are not fixed at Vs/4, as is the voltage across replica circuit 420 (FIG. 4A). However, in some embodiments, the conductance of these elements will not be a strong function of voltage across the element, so their conductance is substantially fixed regardless of the output level being driven out of transmitter equalizer 240.

Referring back to FIG. 2C, pull-up conductances 212 and 216 have about the same voltage across their conductances as do pull-down conductances 214 and 218. However the gate-to-source voltage of the MOSFETs inside pull-up conductances 212, 216 is different from the gate-to-source voltage of the MOSFETs inside pull-down conductances 214, 218. In some embodiments, the shape factors of the MOSFETs that make up pull-up conductances 212, 216 can be increased to compensate for the lower gate-to-source voltage, thereby allowing a single Vr voltage to control both pull-up and pull-down conductances. Unlike pull-down conductances 214, 218, the gate-to-source voltage for the pull-up conductances 212, 216 depends on the output level of the transmitter EQ. For example, when Line P is driven higher than Line N, pull-up conductance 212 has a smaller gate-to-source voltage than conductance 216, and its conductance is therefore lower by some amount. In some embodiments this effect can be corrected by tapering the shape factors of the MOSFETs that make up the incremental conductances inside pull-up conductances 212, 216.

Still referring to FIG. 2C, note that the shunt conductance 220 also experiences a varying gate-to-source voltage, depending on the output level of the transmitter equalizer 240. As explained above with reference to the pull-up conductances, the shunt conductance's conductance elements can be adjusted to have the correct average conductance by scaling the shape factors of the MOSFETs that make up the elements within the variable conductance, to compensate for the difference in average gate-to-source voltage between the shunt conductance 220 and the replica conductance 420. Further, the conductance elements can have their shape factors tapered to handle the variable gate-to-source voltage arising from different output voltage levels from transmitter equalizer 240.

In alternate embodiments, separate replica circuits may be used to generate separate Vr voltages for each of pull-down, pull-up, and shunt conductances. In these embodiments, separate buffers corresponding to buffers 246, 248, 250 in FIG. 2C may be used to drive the three different Vr voltages to the 3 classes of conductances 212-218, 216-214, and 220.

Referring to FIG. 4A and FIG. 2C, the preceding discussion assumes that Vpos and Vneg are voltages near the lowest chip operating potential (typically called "ground" or GND). The previous discussion further assumes that the variable conductances 212, 214, 216, 218, 220 that make up equalizing output driver 104 (FIG. 2C) are composed of NFETs. In some embodiments, Vpos and Vneg may be near the highest on-chip operating potential, typically referred to as "Vdd". In these embodiments, the conductance elements may be composed of PFETs, and the replica bias circuit 400 (FIG. 4A) may use Vpos instead of Vneg as a reference terminal.

In yet other embodiments, Vpos and Vneg may lie midway between Vdd and GND. In these embodiments, the pull-down conductances 214, 218 may be composed of NFETs, the pull-up conductances 212, 216 may be composed of PFETs, and the shunt conductance 220 may be composed of parallel combinations of PFETs and NFETs. Separate Vr voltages generated in separate replica circuits may be required to implement "analog" impedance control in such embodiments.

FIG. 2D illustrates a voltage mode transmitter equalizer using "digital" impedance control, according to still another embodiment. The voltage mode transmitter equalizer of FIG. 2D is an example of digital control (fine tuning) of the impedance of driver 104. In "digital" embodiments of impedance control, the conductance elements 212, 214, 216, 218, 220 can be composed either like those in FIG. 3A (MOSFETs only) or like those in FIG. 3B (series combinations of MOSFETs and resistors). In some embodiments, these MOSFETs are NFETs, and the p control signals 302 toggle between GND and Vdd, so the control signals in FIG. 2D, 222,224,226 are typical "CMOS" level signals.

Voltage mode transmitter equalizer 260 includes an equalizer look-up table (EQ+Z0 LUT) 262, a clocked latch 264, and the variable conductance driver 104. LUT 262 and latch 264, form the driver controller 202 in the embodiment of FIG. 2A, and variable conductance driver 104 is same as that shown in the embodiment of FIG. 2A. As explained above, the s-bit, d-bit values of the control signals 222, 224, 226 needed to obtain pre-calculated conductances values Gu, Gd, and Gs for the various values of output factor A value can be determined and stored in LUT 262.

However, the LUT 262 is designed to have additional storage per entry to fine tune the impedance of driver 104 to compensate for variations in the conductance of individual conductance elements due to variations in temperature and semiconductor process, for example, hence the name EQ+Z0 LUT. For example, if s bits are needed to control the shunt conductance 220 and d bits are needed to control the pull-up and pull-down conductances, additional bits must be added to cover the variation in expected conductance of these elements due to temperature, semiconductor process, and other factors. For example, if the expected variation in resistance is a factor of 2, between the best case and worst case expected resistances, at least one additional binary digit will be required to adjust the conductances both for desired output voltage and to compensate for environmental variables. In general k additional bits are needed to perform this compensation, and control signals 222,226 will become d+k bits wide and control signals 224 will grow to s+k bits. Assuming that the table entries in the EQ+Z0 lookup table are binary numbers of s+k bits, the value of each entry is Gx×ZC, where Gx is the appropriate value computed from EQ's 1, 2, 3, and ZC is an impedance adjustment determined as described in the next paragraph. Gx and ZC are here assumed to be binary numbers.

Figure 4B:
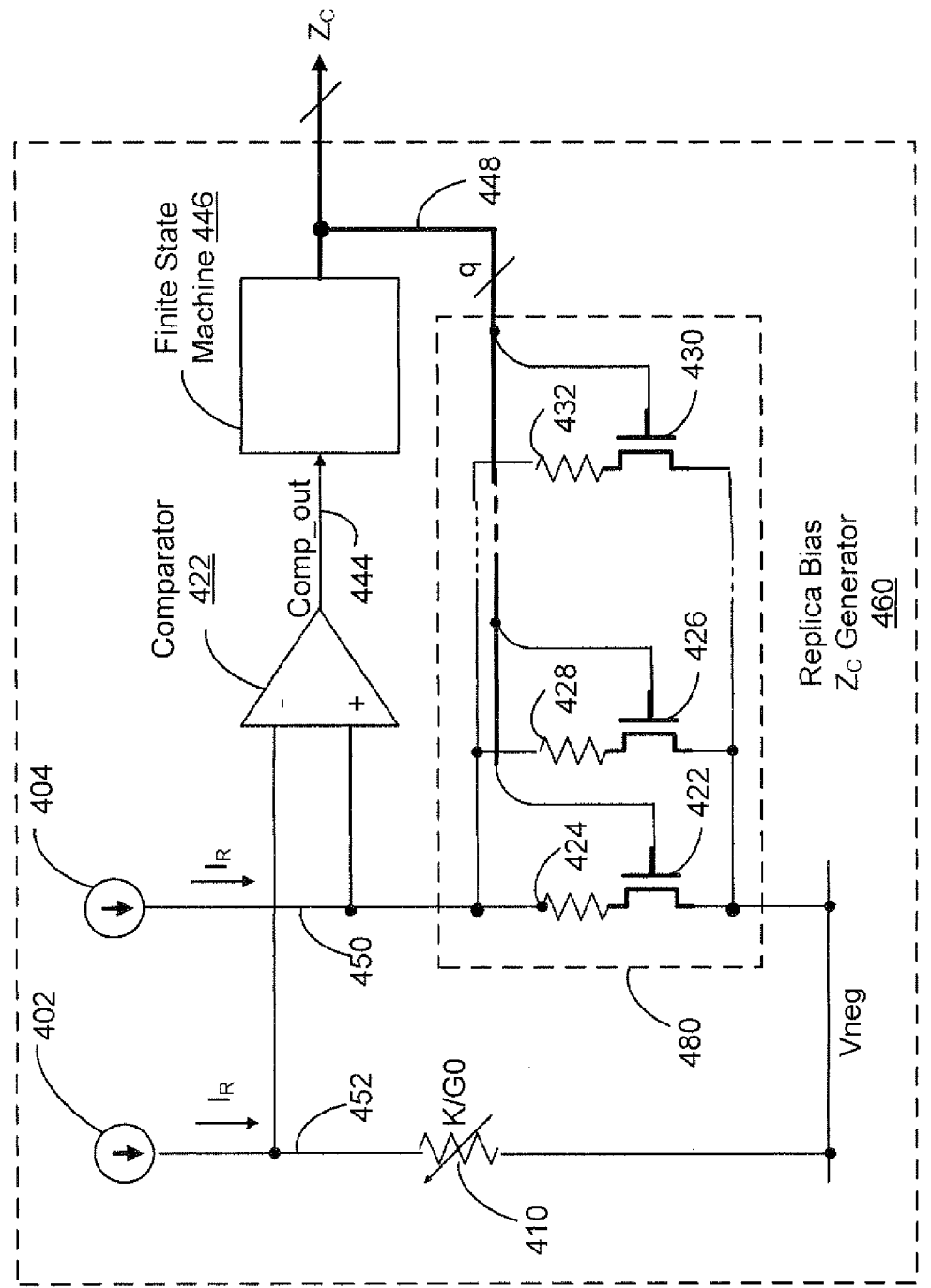
FIG. 4B illustrates a replica bias reference voltage generator for use with the voltage mode transmitter equalizer embodiment of FIG. 2D, according to another embodiment.

In some embodiments, the value of ZC may be determined using a replica circuit as shown in FIG. 4B. By comparison with the replica circuit of FIG. 4A, replica bias ZC generator 460 also has a pair of identical current sources 402, 404 that drive current IR into first, adjustable resistor 410 that is tuned to K×the characteristic impedance of the transmission line to be driven by the driver, and a second, replica conductance 480. In replica bias ZC generator 460, however, the replica conductance 480 is constructed like the variable conductance of FIG. 3B. It comprises a plurality of individual conductances, each composed of a MOSFET (e.g., 422) and a resistor (e.g., 424). In some embodiments, the plurality of individual conductances may be implemented using only MOSFETs. The overall conductance of the replica conductance 480 is adjusted by driving HI or LO values into the q input bits on lines 448. Instead of the analog control loop of FIG. 4A, replica bias ZC generator 460 uses a digital control loop. First, the voltages at node 452 and node 450 are compared in comparator 442. Comparator 442 outputs a digital value on Comp_out 444, which is input to finite state machine (FSM) 446. When, for example, the voltage at node 450 is larger than that at node 452, the comparator 442 outputs a HI. FSM 446 steps its q outputs 448 up by one digital step, thereby increasing the conductance of replica conductance 480. If, however, the voltage at node 450 is less than the voltage at 452, comparator 442 outputs a LO, and FSM 446 reduces the digital value output 448 by one step, thereby reducing the conductance of replica conductance 480. FSM output 448 may be a binary weighted set of digits, corresponding to a binary weighted set of individual conductances 422, 424, 426, 428, . . . , 430, 432, or it may be an N of M coded output (thermometer coded), with equal steps in the conductances within 420, or some other encoding. FSM 446 may further be equipped with logic that determines when the output value is dithering between two adjacent values, and it may include a separately clocked register to drive signals ZC out to its associated voltage mode transmitter equalizing drivers, to avoid dithering of the conductance values within those drivers. In any case, the value computed within replica bias ZC generator 460 is output on the q bits of the ZC output bus, and distributed within a chip, where it can be used to adjust the conductance of one or more transmitters 260 on that chip.

Replica-bias ZC generator 460 is shown merely by way of example and is not intended to limit the scope of this disclosure, as there are many ways to implement a digital impedance control system.

Returning once more to the v-mode TxEQ of FIG. 2D, alternatively, it is also possible to have LUT 262 just store the unadjusted values of control signals 222, 224, 226 not accounting for impedance variation in the transistor switches in driver 104, but have the values of control signals 222, 224, 226 output by LUT 262 further adjusted by multiplying a scaling factor such that adjusted values of control signals 222, 224, 226 add up to the number G×xZC above. This embodiment can be implemented by adding a register (not shown) storing the scaling factor and a high speed multiplier circuit in the data path for each of the control signals 222, 224, 226. The value to be multiplied by is understood to be the value ZC, described in the previous several paragraphs.

The foregoing discussion of "digital" control of the v-mode TxEQ, with reference to FIGS. 2D and 4B assumes that the control signals 222, 224, 226 toggle between the on-chip CMOS power supply voltages. In some embodiments the variation in voltage between VDD and GND (the two CMOS supply voltages) may introduce too large a variation in the conductance of the adjustable conductances 212, 214, 16, 218, 220. In these embodiments, a hybrid analog/digital control system may be employed, in which an on-chip-regulated power supply voltage may be generated in order to stabilize the conductances of the various variable conductances. In such embodiments, register 264 may be powered from this regulated voltage.

The various embodiments of the voltage mode transmitter equalizer described above have the advantage that they allow attenuation of the transmitter's output level by any desired factor between 0 and 1 by appropriately setting the variable conductances included in the transmitter, while holding the return impedance of the transmitter substantially matched to the differential impedance of the transmission lines and the supply current substantially constant. Impedance and output amplitude control are performed by the same variable conductance devices, unlike conventional current mode transmitters in which impedance control and amplitude control are separated.

Figure 5A:
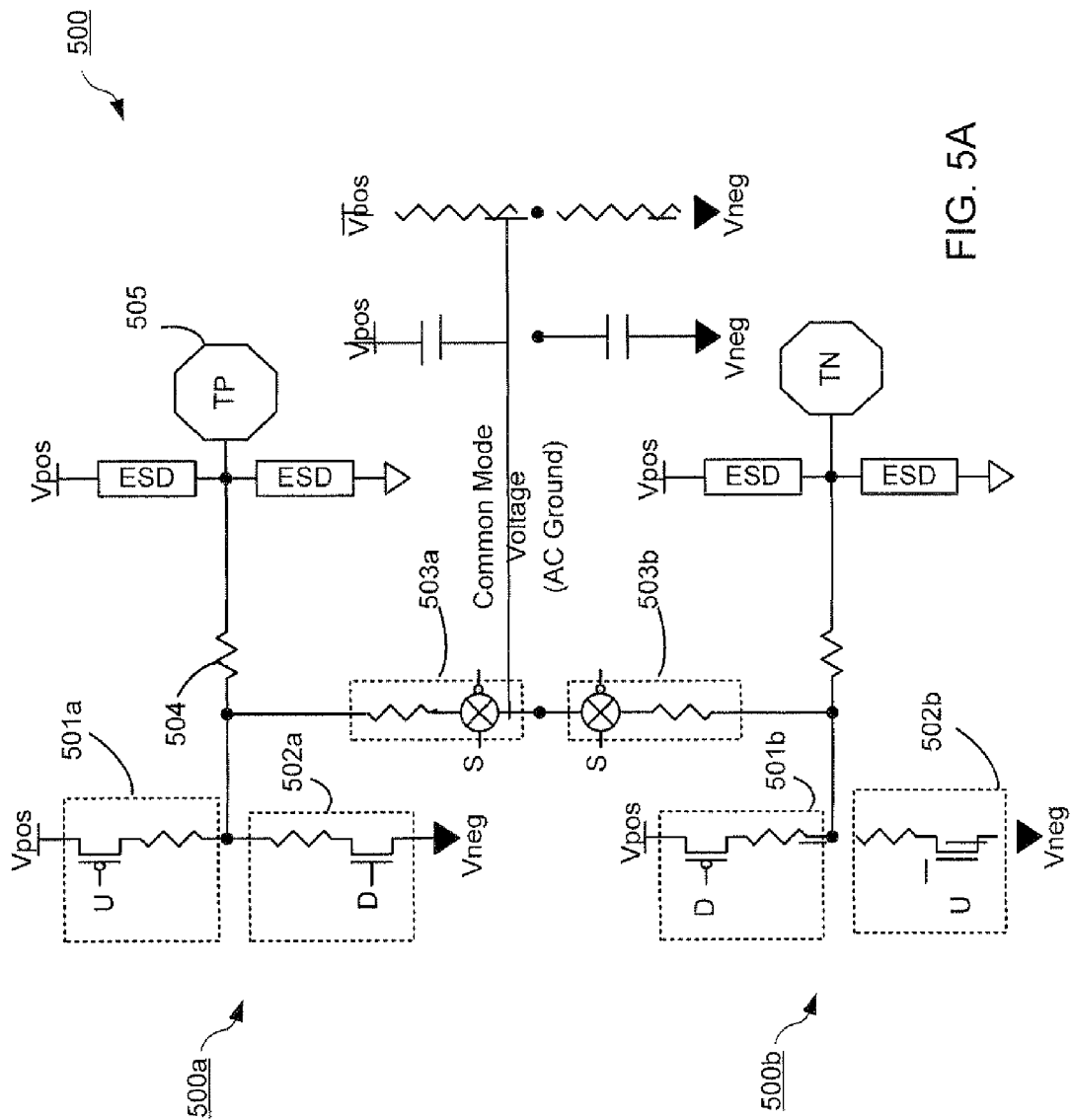
FIGS. 5A, 5B, and 5C illustrate a voltage mode transmitter equalizer using digital impedance control, according to still another embodiment.
Figure 5B:
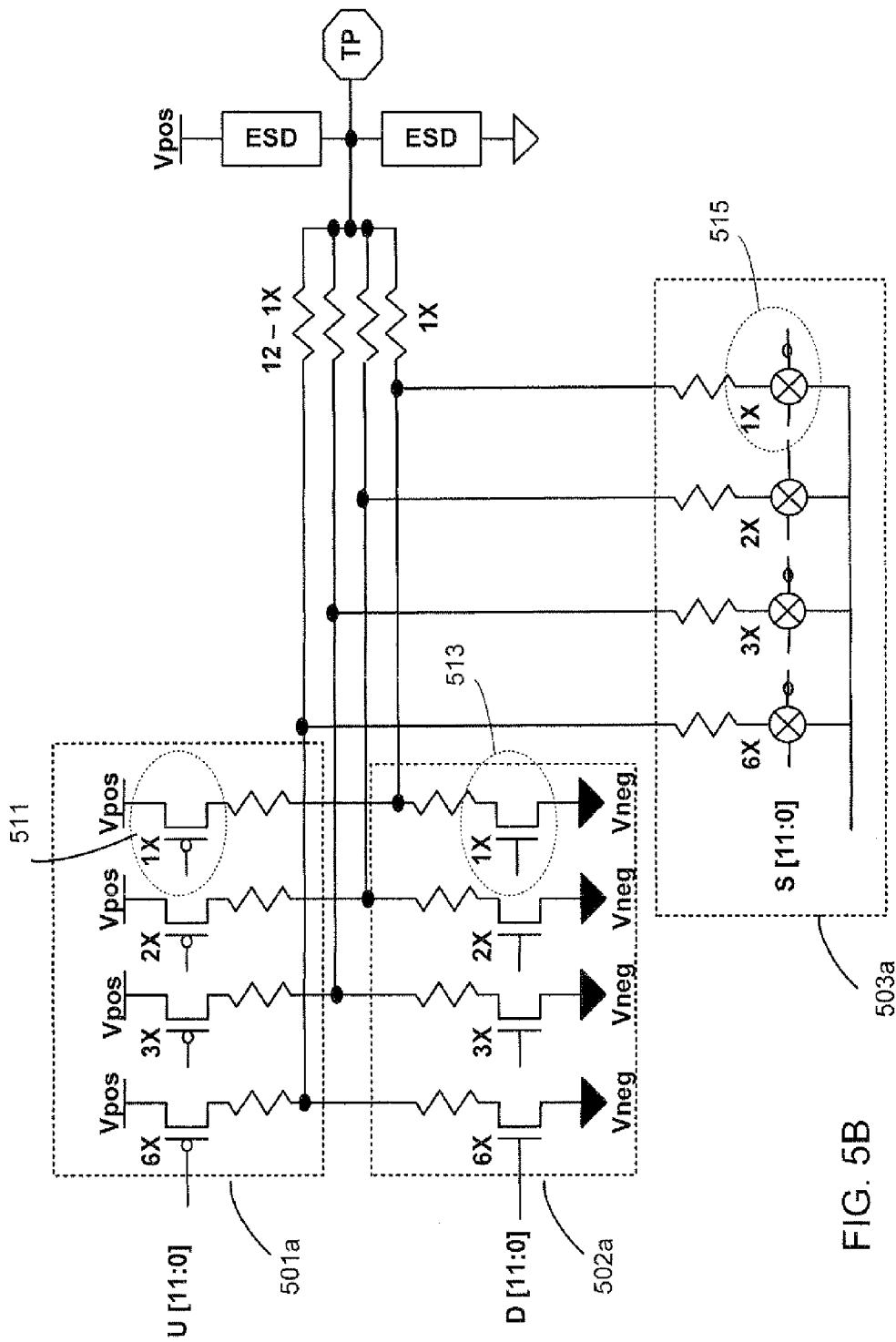
Figure 5C:
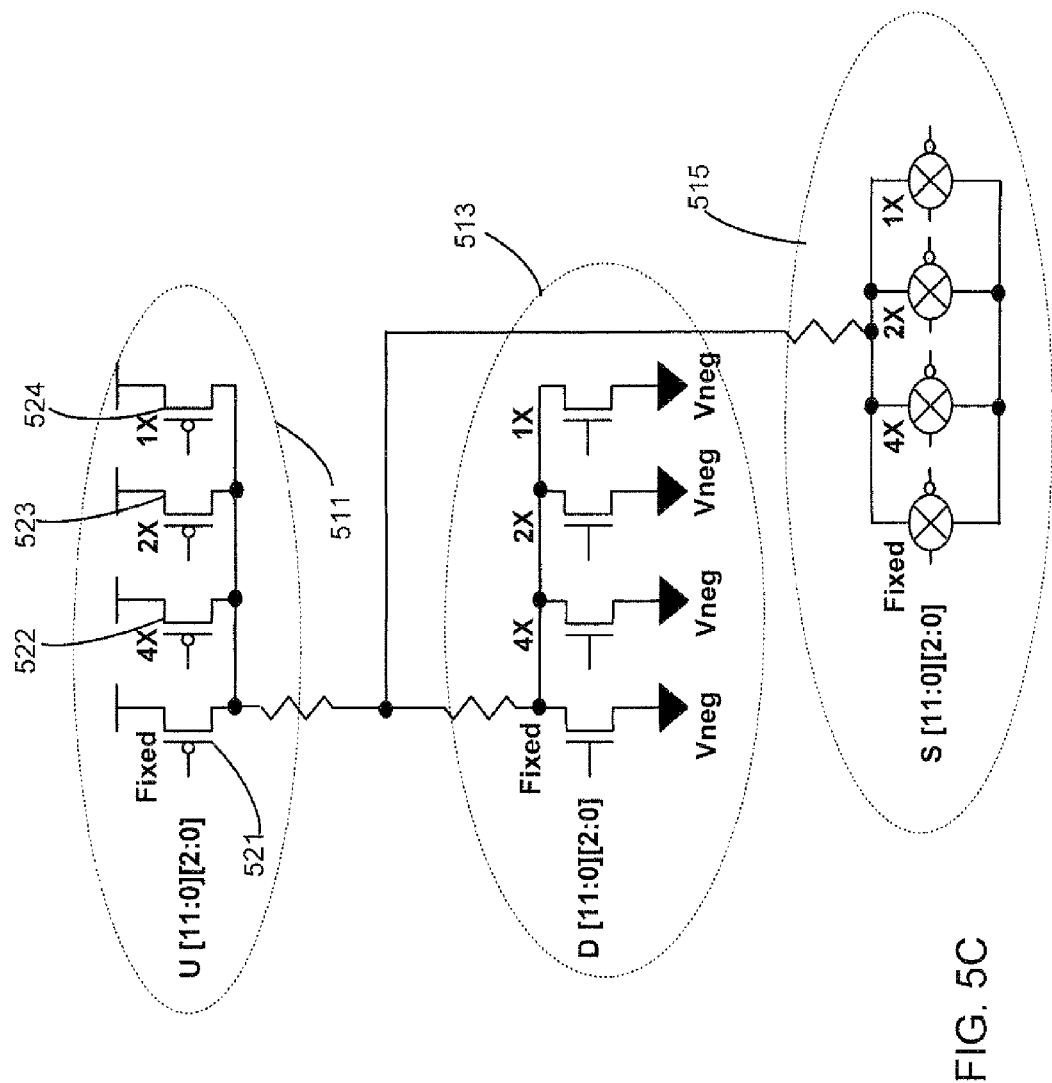

FIGS. 5A, 5B, and 5C illustrate a voltage mode transmitter equalizer 500 using digital impedance control, according to still another embodiment. In this implementation, the stability of the supply current is compromised slightly to make way for more feasible and economic digital implementation of the transmitter equalizer shown in FIG. 2A. This implementation allows large, protocol compliant swings using a single tap of programmable equalization.

FIG. 5A shows a collapsed view of both a TP driver 500a and a TN driver 500b in the voltage mode transmitter equalizer 500. TP driver 500a includes a pull-up circuit (or pull-up conductance) 501a, a pull-down circuit (or pull-down conductance) 502a, and a shunt circuit (or shunt conductance) 503a, while TN driver includes a pull-up circuit 501b that is substantially the same as the pull-up circuit 501a, a pull-down circuit 502b that is substantially the same as the pull-down circuit 502a, and a shunt circuit 503b that is substantially the same as the shunt circuit 503a. Only the operation of the TP driver 500a is explained herein for simplicity of illustration, as the TN driver 500b has a structure that is substantially the same as that of the TP driver 500a, and the operation of the TN driver 500b mirrors that of the TP driver 500a. The pull-up circuit 501a and pull-down circuit 502a can each be considered as comprised of a transistor and resistor component. A shunt circuit 503a can be considered as comprised of a pass gate (or transfer gate) and a resistor. In addition, a common resistor component 504 is shown attached to a pad 505. Without the resistor 504, the transistors or resistors in the pull-up circuit 501, the pull-down circuit 502, and the shunt circuit 503 would have to connect directly to the pad 505. Thus, employing the common resistor 504 can reduce the number of connections to the pad 505, and help minimize capacitance associated with the connections. Since the common resistor 504 in this case affects the termination impedance when pulling up, pulling down or shunting, its value may need to be considered during calibration of the pull-up conductance 501, pull-down conductance 502, and shunt conductance 503. Since transistors typically have more process, voltage and temperature variation than resistors, it is desirable to implement as much of the series impedance of the transistor and resistor combination as feasible in the resistor. However, as the resistor component gets larger so does the size of the transistor, thus increasing the switching power (not to mention silicon area). So, in one embodiment, the transistors are sized to be as small as feasible while considering normal production variation, which then dictates the size of the resistors to implement the termination impedance. TP driver 500a and TN driver 500b drive opposite voltage values. When TP driver 500a drives a high voltage, TN driver 500b would drive a low voltage, and vice versa.

FIG. 5B shows the P-driver in more detail. Each pull-up conductance 501a, pull-down conductance 502a, and shunt conductance 503a is comprised of twelve matched slices. Each slice 511, when being turned on, is, for example, 600 ohms, so that when all twelve slices are turned on, in parallel they form a desired resistance (e.g., 50 ohm) that is about half the desired differential termination resistance of 100 ohms. The slices can be grouped in 4 different bundles of 6, 3, 2 and 1 (total of 12). Each bundle is controlled by a data stream that is dependent upon the level of equalization desired. With only one equalization tap, the logic to control the output is rolled into a pre-driver (not shown), bypassing the need for a look-up table or more complicated control mechanism. The termination impedance is kept matched by allowing a total of twelve slices to be activated at any time. As an example, Table 1 below illustrates conductance settings (i.e., number of slices that are turned on) of the pull-up, pull-down and shunt circuits in the TP driver and TN driver, the output voltage level, the line current, the supply current, and back termination resister RTerm when −3.5 dB of equalization is being implemented in driver 500 and a sequence of data bits of 011100 is being transmitted, assuming a 400 mV maximum output swing (i.e., Vpos−Vneg=800 mV), and assuming that the data bit immediately before the sequence of data bits is a 1. Here the output voltage VOUT=VTP−VTN.

TABLE 1

| | Data Bits | | | | | |
|---|---|---|---|---|---|---|
| | 0 | 1 | 1 | 1 | 0 | 0 |
| A | 1 | 1 | 0.667 | 0.667 | 1 | 0.667 |
| $V_{OUT}$ (mV) | −400 | 400 | 267 | 267 | −400 | −267 |
| $I_L$ (mA) | −4 | 4 | 2.7 | 2.7 | −4 | −2.7 |
| 501a | 0 | 12 | 8 | 8 | 0 | 0 |
| 502a | 12 | 0 | 0 | 0 | 12 | 8 |
| 503a | 0 | 0 | 4 | 4 | 0 | 4 |
| 501b | 12 | 0 | 0 | 0 | 12 | 8 |
| 502b | 0 | 12 | 8 | 8 | 0 | 0 |
| 503b | 0 | 0 | 4 | 4 | 0 | 4 |
| Is (mA) | 4 | 4 | 3.6 | 3.6 | 4 | 3.6 |
| $R_{Term}$ (Ω) | 50 | 50 | 50 | 50 | 50 | 50 |

As shown in Table 1, to transmit a "transition bit" of "1" (a transition bit being a bit in a data stream that is different from the previous bit), all twelve slices of each pin of the pull-up conductance 501a would be enabled, thus yielding the maximum output swing (A=1) and 50 ohms of back termination RTerm. To transmit a non-transition bit of "1" (a non-transition bit being a bit that is unchanged from its previous bit) in the data stream, 8 slices (the 6× and 2× bundles of pull-up circuit 501) would still pull-up while 4 slices (the 3× and 1× bundles of conductance 503) would shunt. The transistors in the pull-down conductance 502 are left open (or turned off) to imitate a large resistance (e.g., 1800 ohm) in this implementation (i.e., Equations (1), (2), and (3) are not followed strictly), so as to eliminate the need for logic to drive the pull-down conductance 502a during equalization and the need to implement a large resistor in the pull-up and pull-down conductances. An output swing that is 66.7% (A=0.667 or −3.5 dB) of that of the transition bit is provided for the non-transition bit. Since there are still twelve 600 ohm slices in parallel (8 slices in the pull-up conductance 501 and 4 slices in the shunt conductance 503), the termination impedance is maintained at 50 ohms. However, as A goes from 1 to 0.667, the supply current goes from 4 mA to 3.6 mA and the line current on the transmission lines goes from 4 mA to 2.7 mA. Thus, a small sacrifice of about 10% data-dependent variation in the supply current is incurred for a simplified implementation. If more equalization is required, the supply current can go even lower for this implementation. For example, when output factor A=0.5, the supply current may be down to 3 mA (25% variation) in this implementation. So, considering all other factors such as changes caused by process, voltage, and temperature variations, there can be a data-dependent variation of about 30% in the supply current in this digital implementation of the voltage-mode transmitter equalizer 100. Compared to conventional voltage-mode transmitter equalizers where the data dependent supply current variation can be 75% or higher, the voltage-mode transmitter equalizer 500 still provides significant improvement in the variation of supply current during equalization.

Other equalization settings can be obtained by allocating the bundles for the transition bits and subsequent bits differently.

FIG. 5C shows an expanded view of one slice of each of the conductors 501, 502, 503 and how each slice can be kept to 600 ohms across process, voltage and temperature variations. Each transistor 511, 513, 515 is actually comprised of 4 devices as shown in FIG. 5B. For example, transistor 511 is actually comprised of 4 devices 521, 522, 523, 524 digitally controlled at essentially DC rates. During calibration, the output impedance for a slice 511, 513, 515 is compared to 600 ohms and the appropriate "code" to achieve matched impedance is determined and broadcasted to all the slices. Such code to achieve matched impedance is included in the last 3 bits [2:0] of the control signals U[11:0][2:0], D[11:0][2:0], S[11:0][2:0] each controlling the conductances 511, 513, 515, respectively, similar to the additional bits per entry added to the EQ+Z0 LUT 262 in the embodiment of FIG. 2D. In this case there are 8 different codes to compensate for process, voltage and temperature variations. For example, when the combination of resistance and transistor impedance is at a maximum, all 4 transistors (the fixed (521), 4× (522), 2× (523) and 1× (524) devices) can be enabled to achieve a composite 600 ohms. In the opposite corner, when the process, voltage and temperature conspire for minimum impedance, the 4×, 2× and 1× transistors can be disabled, leaving the fixed device to achieve 600 ohms. In between, a code can be applied to get within a few percent of the target impedance. Note that the transistors or conductances 511, 513, 515 can all be calibrated independently.

Figure 6A:
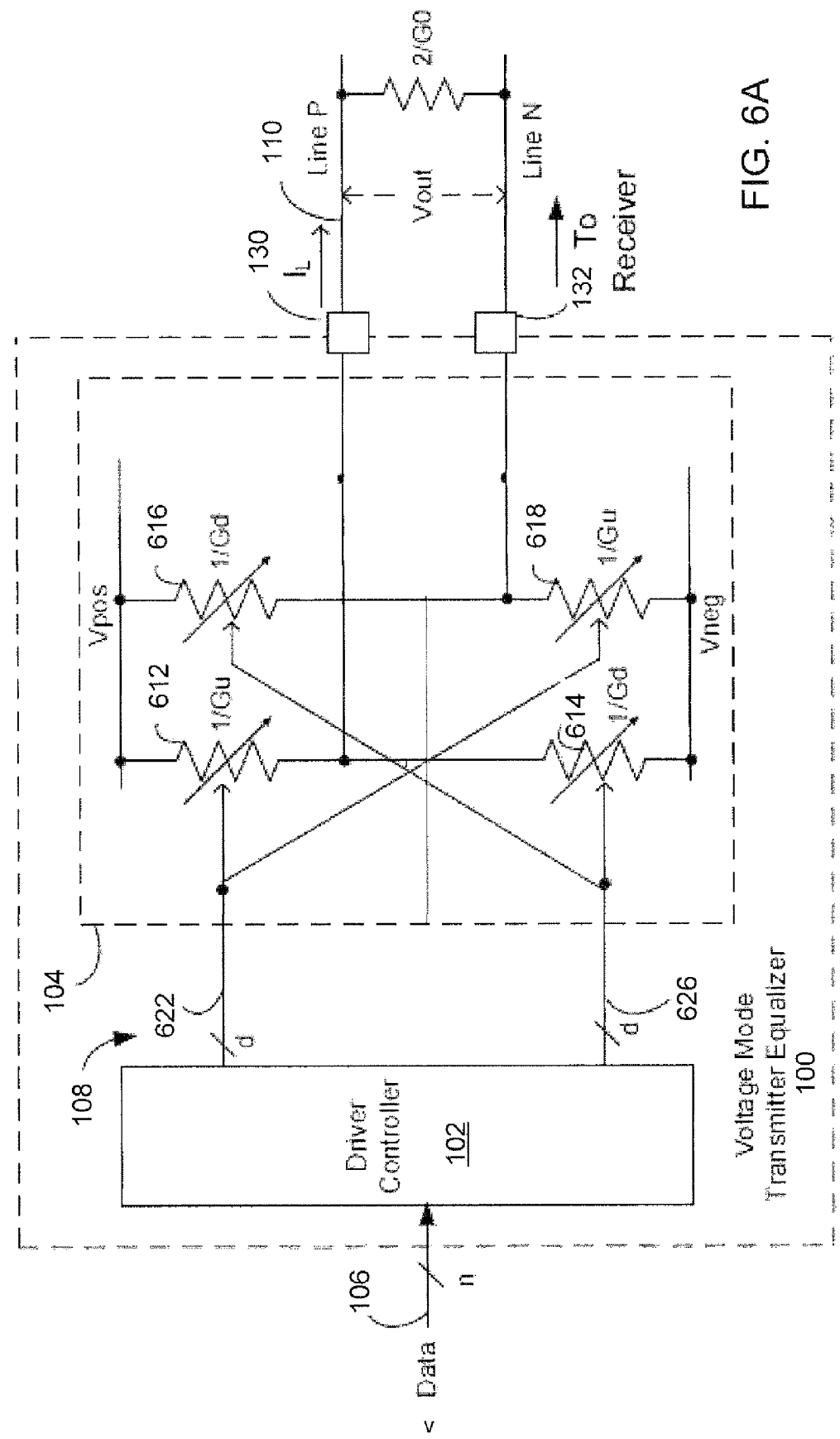
FIG. 6A and FIG. 6B illustrate embodiments of a driver of a voltage-mode transmitter equalizer.
Figure 6B:
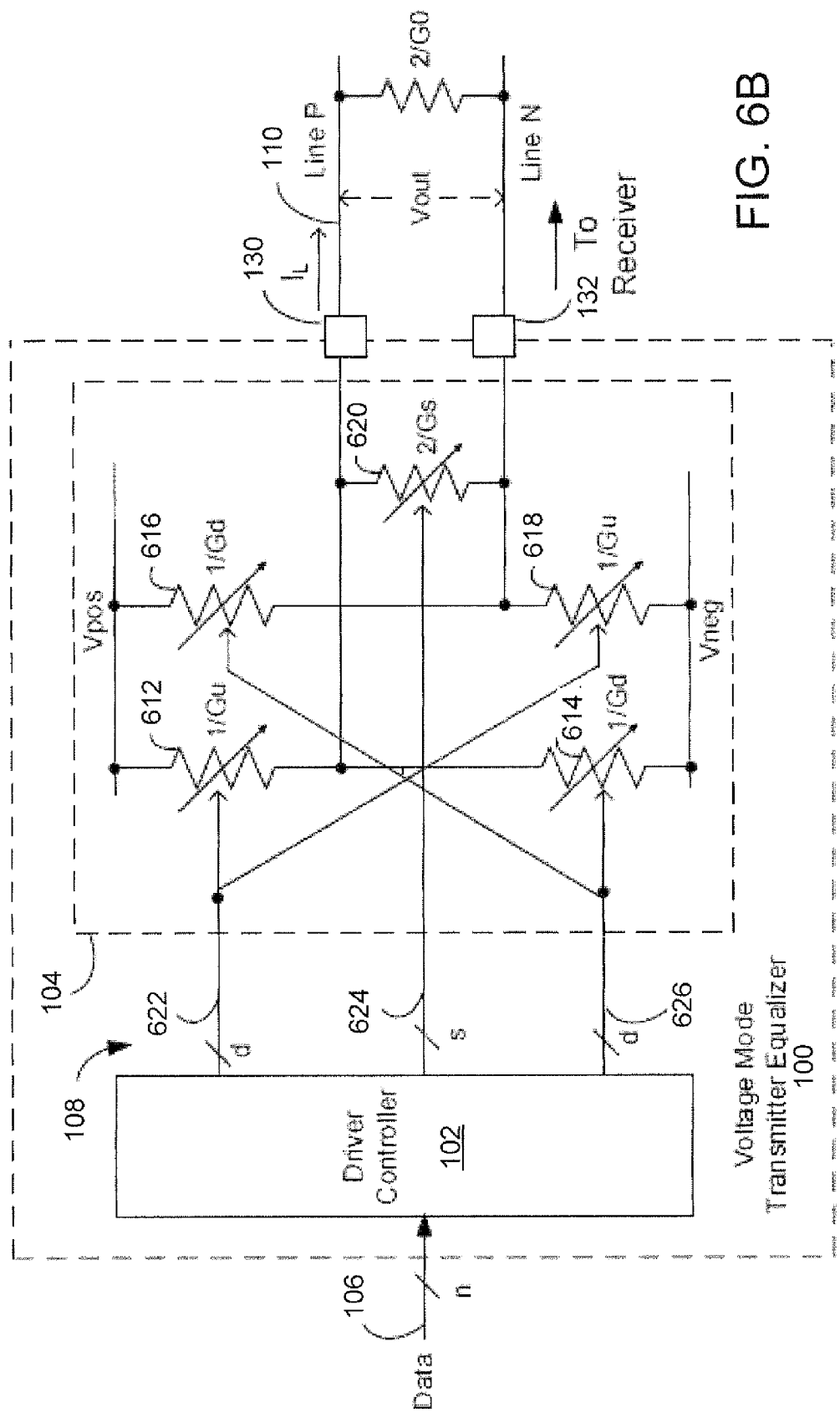

FIG. 6A and FIG. 6B illustrate embodiments of the driver 104 of a voltage-mode transmitter equalizer. Both embodiments include comparable circuitry for providing fine-granularity voltage-mode equalization. FIG. 6B further includes circuitry to maintain the driver supply current Is at a constant value.

FIG. 6A illustrates one implementation of the driver 104 of FIG. 1, according to one embodiment. As shown in FIG. 6A, control signal(s) 108 includes control signals 622, 626 for controlling driver 104. Control signals 622 and 626 are each d-bits wide, and control signal 624 is s-bits wide. Here, d and s each represent an integer equal or greater than 1.

In one embodiment, driver 104 includes variable conductances 612, 618 with variable conductance value Gu, and variable conductances 616, 614 with variable conductance value Gd. The conductance of variable conductances 612, 618 is adjusted by control signal 622, and the conductance of variable conductances 616, 614 is controlled by control signal 626. For example, when control signal 622 is at its maximum (all "1"s), conductances 612, 618 would be at their maximum. When control signal 622 is at its minimum (all "0"s), conductances 612, 618 would be at their minimum. And, when control signal 622 is between its minimum and maximum, conductances 612, 618 would have conductances between their minimum and maximum. Other variable conductances 616, 614 are controlled similarly according to the corresponding control signal 626. Conductances 612 and 616 are sometimes referred to as pull-up conductances, while conductances 614 and 618 are sometimes referred to as pull-down conductances. Driver 104 can be considered as including a P-driver formed by pull-up conductance 612 and pull-down conductance 614, and a N-driver formed by pull-up conductance 616 and pull-down conductance 618.

Control signals 622, 626 adjust the conductances 612, 618 and conductances 616, 614 such that the total impedance of driver 104 ($1/G_T$), measured between its two output terminals 130, 132, is matched to the differential impedance of the differential transmission line formed by Lines P and N (i.e., 2/G0, where G0 is the characteristic conductance of each of Lines P and N), regardless of the data pattern of input data 106 and the resulting output factor A.

FIG. 6B illustrates an implementation of the driver 104 of FIG. 1 according to a further embodiment. Here, the driver 104 is comparable to the driver depicted in FIG. 6A, with the addition of a variable shunt conductance 620 and corresponding control signal 624. As described above with reference to FIG. 6A, the conductance of variable conductances 612, 618 is adjusted by control signal 622, and the conductance of variable conductances 616, 614 is controlled by control signal 626. An additional variable shunt conductance 620 may be implemented as two separate conductances connected in series, with each conductance having conductance value Gs or as one conductance having conductance value Gs/2. The conductance of variable shunt conductance 620 is controlled by the control signal 624.

Control signals 622, 624, 626 adjust the conductances 612, 618, conductances 616, 614, and shunt conductance 620 such that the total impedance of driver 104 ($1/G_T$), measured between its two output terminals 130, 132, is matched to the differential impedance of the differential transmission line formed by Lines P and N (i.e., 2/G0, where G0 is the characteristic conductance of each of Lines P and N), regardless of the data pattern of input data 106 and the resulting output factor A. Specifically, control signals 622, 624, 626 are generated to adjust conductances 612, 618, conductances 616, 614, and shunt conductance 620 such that they each have a predetermined relation with the equalization constant |A|. In an ideal implementation, conductances 612, 618, conductances 616, 614, and shunt conductance 620 are related to each other and to the equalization constant |A| at least approximately in accordance with the following Equations 1, 2, and 3. These equations serve as a guide when driver 104 is being implemented. Deviation from these equations can occur, however, depending on specific implementations, as discussed below.

$$Gu = \frac{G0(1+A)^2}{4} \quad \text{Equation 1}$$

$$Gd = \frac{G0(1-A)^2}{4} \quad \text{Equation 2}$$

$$Gs = \frac{G0(1+A)(1-A)}{2}. \quad \text{Equation 3}$$

The values of control signals 622, 624, 626 are generally computed using the above Equations 1, 2, and 3, up to the bit precision necessary for a corresponding acceptable error (tolerance). The required output factor A is determined based on the data pattern of a set of data bits 106. The number of data bits in the input data 106 used to determine the output factor A is equivalent to the number of "taps" of the digital filter implemented in the v-mode transmitter equalizer 200. For example, 3 bits of precision may be required for output factor A (i.e., 8 steps in output factor A). To achieve this resolution, 5 bits of precision may be used for each of conductances 612, 618, 616, 614, and 4 bits for shunt conductance 620 (i.e., s=4, d=5). Embodiments of the driver 104 may exceed such precision.

When conductances 612, 618, 616, 614 are adjusted in this manner, driver 104 draws a supply current Is that is substantially equal to the maximum line current $I_{L,MAX}$ on transmission Lines P and N, regardless of the data pattern of input data 106 and the resulting output factor A. Thus, driver 104 has minimal variation in the supply current Is, regardless of the data pattern of input data 106 and the resulting output factor A. For example, if 3 bits of precision are needed for output factor A (i.e., 8 steps in output factor A), and 5 bits (d=5) of precision are used for each of the conductances 612, 618, 616, 614, and 4 bits (s=4) of precision for shunt conductances 620, a data-dependent variation in the supply current between Vpos and Vneg may be about 7%, or less than 10%. Here, the data-dependent variation in the supply current is defined as $(I_{S,MAX} - I_{S,MIN})/I_{S,MAX}$, where $I_{S,MAX}$ corresponds to a maximum Is value, which usually occurs when no equalization is applied, and where $I_{S,MIN}$ corresponds to a minimum Is value which occurs when certain amount of equalization is applied.

In this regard, the variable shunt conductance 620, with its conductance controlled as explained above, enables the driver 104 to have reduced, uniform supply current Is between Vpos and Vneg. With addition of the variable shunt conductance 620, the supply current Is between the power supplies Vpos, Vneg is significantly reduced, compared with conventional voltage-mode transmitter equalizers and has minimal variation (is substantially constant). More details of embodiments using the shunt conductance 620 can be found in U.S. Provisional Application 61/164,354, entitled "Constant Supply Current Voltage Mode Transmitter Equalizer," filed on Mar. 27, 2009, which is incorporated herein by reference in its entirety.

According to the embodiments, the variable conductors 612, 614, 616, 618, 620 may be set by respective control signals 622, 626, 624 to one of a substantial number of conductance values. As a result, the driver 104 may provide equalization settings with a fine granularity.

Figure 7A:
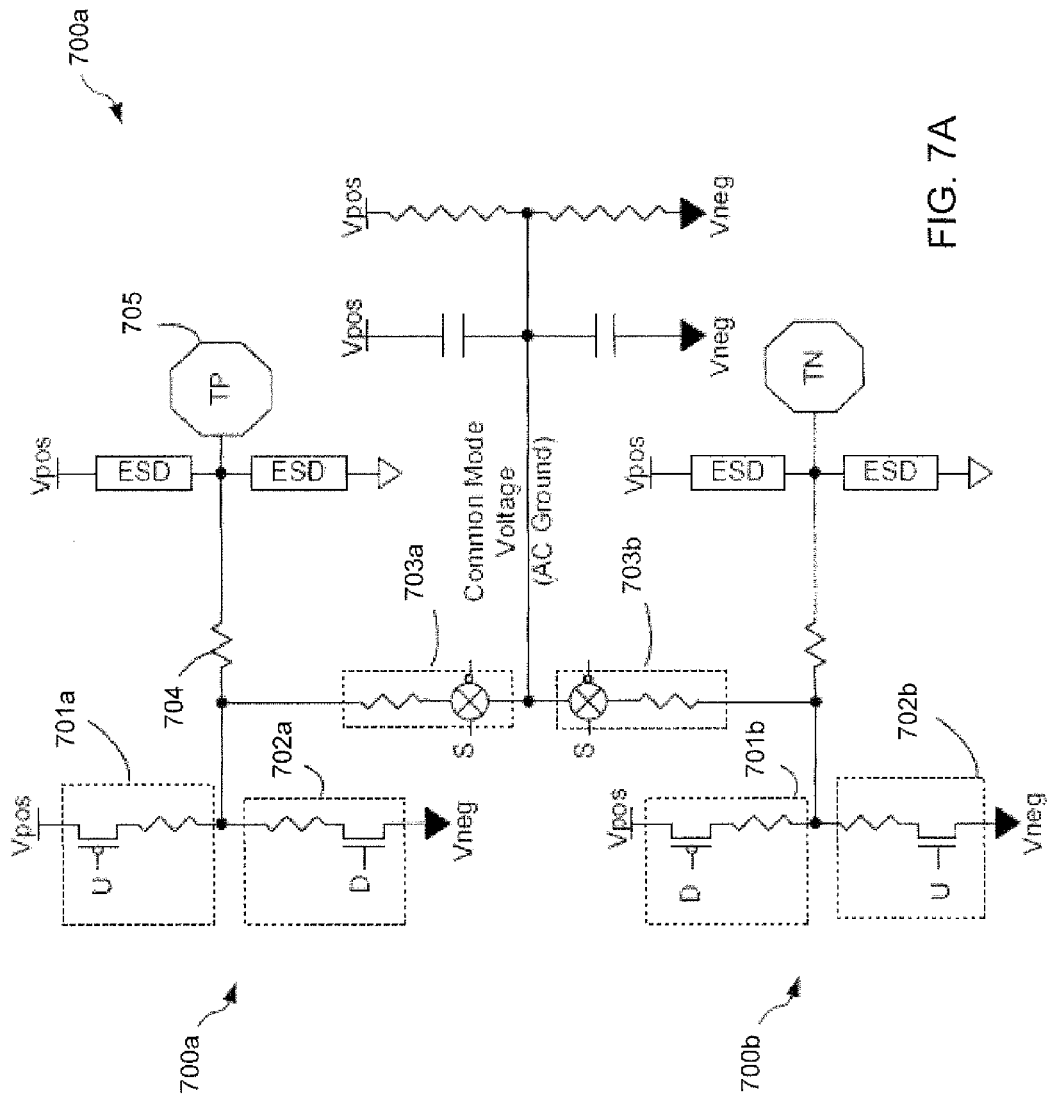
FIG. 7A shows a pair of transmission line drivers of a voltage-mode transmitter equalizer.

FIG. 7A shows a collapsed view of both a transmission line P driver (TP) 700a and a transmission line N driver (TN) 700b in the voltage mode transmitter equalizer 700. TP driver 700a includes a pull-up circuit (or pull-up conductance) 701a, a pull-down circuit (or pull-down conductance) 702a, and a shunt circuit (or shunt conductance) 703a, while TN driver includes a pull-up circuit 701b that is substantially the same as the pull-up circuit 701a, a pull-down circuit 702b that is substantially the same as the pull-down circuit 702a, and a shunt circuit 703b that is substantially the same as the shunt circuit 703a. Only the operation of the TP driver 700a is explained herein for simplicity of illustration, as the TN driver 700b has a structure that is substantially similar to that of the TP driver 700a, and the operation of the TN driver 700b mirrors that of the TP driver 700a. As described above, embodiments may be configured absent the shunt circuits 703a, 703b.

FIG. 7A also shows an equivalent circuit of each of the pull-up circuit 701a and pull-down circuit 702a as including a transistor and resistor component or comparable circuitry. An equivalent circuit of a shunt circuit 703a is shown to include a pass gate (or transfer gate) and a resistor or comparable circuitry. A common resistor component 704 is shown attached to a pad 705. Without the resistor 704, the transistors or resistors in the pull-up circuit 701, the pull-down circuit 702, and the shunt circuit 703 would have to connect directly to the pad 705. Thus, employing the common resistor 704 can reduce the number of connections to the pad 705, and help minimize capacitance associated with the connections. Since the common resistor 704 in this case affects the termination impedance when pulling up, pulling down or shunting, its value may need to be considered during calibration of the pull-up conductance 701, pull-down conductance 702, and shunt conductance 703. Because transistors typically have more process, voltage and temperature variation than resistors, it is desirable to implement as much of the series impedance of the transistor and resistor combination as feasible in the resistor. However, as the resistor component gets larger so does the size of the transistor, thus increasing the switching power (not to mention silicon area). So, in one embodiment, the transistors are sized to be as small as feasible while considering normal production variation, which then dictates the size of the resistors to implement the termination impedance. TP driver 700a and TN driver 700b drive opposite voltage values. When TP driver 700a drives a high voltage, TN driver 700b would drive a low voltage, and vice versa.

Figure 7B:
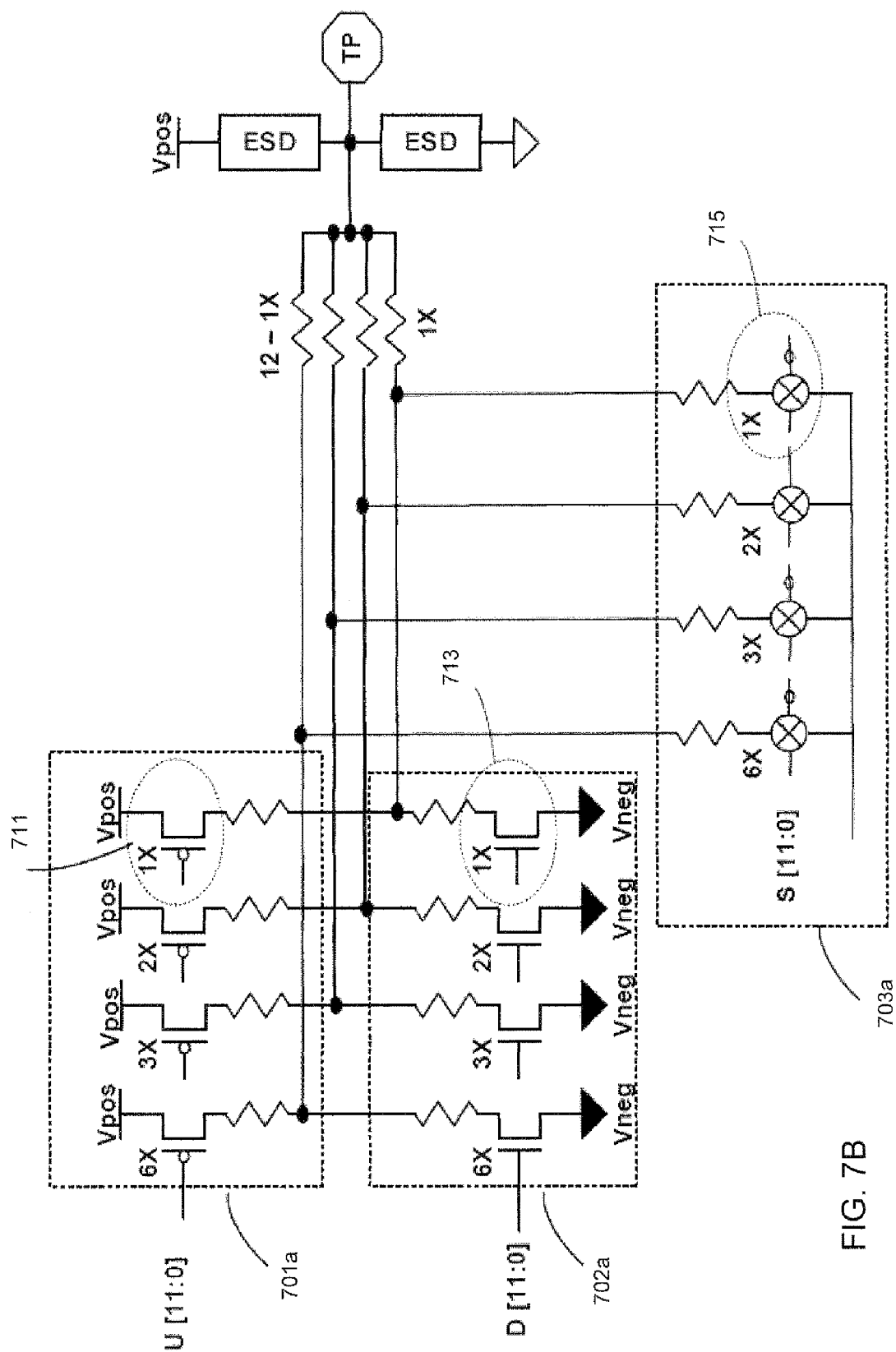
FIG. 7B shows a transmission line driver of FIG. 7A in further detail.

FIG. 7B shows the TP-driver 700a of FIG. 7A in further detail. The TN-driver 700b generally mirrors the TP-driver in its configuration, and thus discussion below related to the TP-driver may be applied to the TN-driver with appropriate modification as understood by those of ordinary skill in the art. Each pull-up conductance 701a, pull-down conductance 702a, and shunt conductance 703a in the TP-driver is shown to be comprised of a plurality of (e.g., 12) conductance channels. Each conductance channel (e.g., conductance channels 711, 713) of the pull-up and pull-down conductances 701a, 702a, includes a resistor having a resistance value selected from a set of resistance values. The resistance values are such that, when all twelve conductance channels are turned on, in parallel they form a desired resistance (e.g., 50 ohm) that is about half the desired differential termination resistance of 100 ohms. The conductance channels in each conductance 701a, 702a, or 703a can be arranged in groups, such as in 4 different groups of 6, 3, 2 and 1 (total of 12) conductance channels, or in other combinations. Each conductance channel in conductance 701a, 702a, or 703a is controlled by one of 12 parallel bits of the control signal U[11:0], D[11:0], or S[11:0], respectively, that corresponds to a selected level of equalization. In one embodiment, the parallel bits controlling the conductance channels in each group may be the same and may be based on the same serial data stream 108. The termination impedance is kept matched by controlling the conductance channels such that a total of twelve conductance channels from the pull-up conductance 701a and pull-down conductance 702a are activated (enabled) at any time. Thus, the activated conductance channels in the pull-down conductance 702a compliments those of the pull-up conductance 701a. Further, the number of activated conductance channels in pull-up conductance 701a, pull-down conductance 702a and shunt conductance 703a are selected such that Equations 1-3 are satisfied.

Figure 7C:
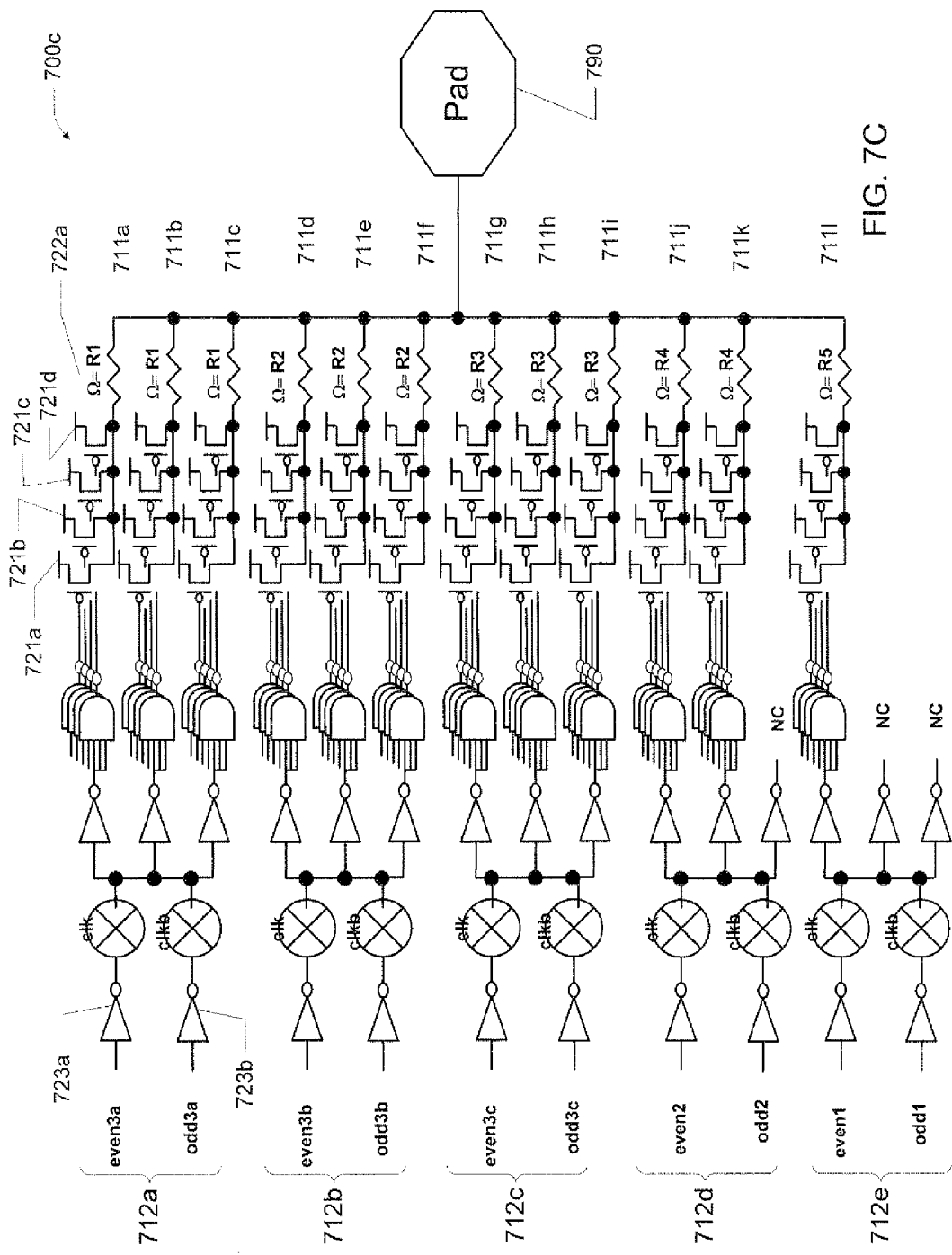
FIG. 7C illustrates a pull-up circuit.

FIG. 7C illustrates a pull-up circuit 700c. The pull-up circuit 700c may be implemented, for example, as the pull-up conductance 701a in FIG. 7B. A pull-down circuit and a shunt circuit can be configured similarly for the pull-down conductance 702a and shunt conductance 703a in FIG. 7B, respectively, using the same set of resistance values and groupings as in the pull-up circuit 700c, as discussed below. The pull-up circuit 700c includes 12 conductance channels 711a-7111 connected in parallel to a common termination 790, the conductance channels 711a-1 being arranged into 5 groups 712a-e. The enabling and disabling of the constituent conductance channels in each group are controlled by a respective control bit of the corresponding control signal. In one embodiment, for each data bit to be transmitted by the transmitter equalizer 100, 5 parallel control bits of a first control signal are used to set the respective groups of conductance channels in the pull-up circuit 700c so that together they form a pull-up conductance corresponding to the equalization setting for transmitting the data bit. Likewise, 5 parallel control bits of a second control signal are used to set the respective groups of conductance channels in the pull-down circuit (not shown) so that together they form a pull-down conductance corresponding to the equalization setting for transmitting the data bit. The 5 parallel control bits of each control signal represent a 5-bit code corresponding to a selected level (or setting) of equalization for transmitting the data bit. For double-data-rate operation, each group of conductance channels has two inputs 723a and 723b, one to receive a corresponding control bit for an even data bit, and one to receive a corresponding control bit for an odd data bit.

Group 712a, for example, receives a control bit at inputs 723a or 723b. In response to the control bit, respective conductance channels 711a-711c are enabled and disabled uniformly. In one embodiment, in each conductance channel 711a, up to four transistors 721a-721d can be used to enable and disable current through a respective resistor (e.g., resistor 722a). The resistance value R1 of conductance channel 711a is a composite value comprising the series combination of the resistor 722a and a combination of the transistors 721a-721d, which can be adjusted The combination enabled and disabled transistors 721a-721d is determined by a calibration process. In one embodiment, a "replica" circuit (not shown) is formed in the same integrated circuit including the V-mode Tx EQ 100 to replicate one of the conductance channels in each group of the conductance channels. During calibration of the conductance channels prior to operation of the transmitter, the resistance value of the "replica" circuit (not shown) for each group of conductance channels may be compared against an external resistor (not shown). The configuration of such a replica circuit resulting from the comparison is represented by a "calibration code," which may be replicated to each of the conductance channels in the group of conductance channels. Alternatively, the output impedance for each conductance channel 711a-1 is measured and compared against a reference resistance matching the intended corresponding resistance value (i.e., R1-R5). Thus, for conductance channel 711a, a sequence of particular ones of the transistors 721a-d that enables the resistor 722a to match a resistance value of R1 is determined, and that sequence is stored as a "code" that is referenced when the respective group 712a is enabled. As a result, each of the conductance channels may be calibrated individually to compensate for process, voltage, temperature and other variations. For example, when the combination of resistor 711a and transistor 721a-d impedance is at a maximum, all 4 transistors 721a-d can be enabled to achieve a composite resistance value of R1. Conversely, when the process, voltage and temperature conspire for minimum impedance, transistor 721a-c can be disabled through recalibration, leaving the transistor 721d to achieve the resistance value R1.

If all resistance values R1-R5 are equal, then a total of 12 equalization settings can be selected. However, by selecting different resistance values, a greater number of equalization settings, and thus a finer granularity of equalization settings, can be achieved. In such a configuration, the resistance values among the conductance channels within a group may be matched, while the resistance values of the conductance channels of another group may be distinct. For example, the conductance channels 711a-c of group 712a each have a resistance value of R1; in contrast, the conductance channels 711*d-f* of group 712*b* each have a resistor with a resistance value of R2. By selecting different resistance values R1-R5 among the conductance channels 711*a*-1, a substantial number of different equalization settings can be achieved by selectively enabling and disabling the conductance channels 711*a*-1. The resistance values R1-R5 can be selected in accordance with one or more principles. In one embodiment, for example, the resistance values R1-R5 may be selected to achieve the following goals:

1. All resistance values remain within a given range (e.g., 25%) of a mean resistance value. This constraint may enable easier implementation in an integrated circuit or other device;
2. A substantially linear distribution of equalization settings across a set of desired equalization levels is achieved. One or more specific equalization settings can be achieved through a particular combination of the conductance channels. This constraint may ensure that the transmitter equalizer can operate with a receiving device employing a communications protocol (e.g., PCIe, Gen 2) that calls for particular equalization settings.

Additional constraints may be employed in addition to, or in place of, the aforementioned goals. In particular, the resistance values R1-R5 may be selected such that, when all conductance channels 711*a*-1 are enabled, the impedance across the voltage-mode transmitter is a particular value (e.g., 50 ohms). Given a set of design goals and constraints as above, resistance values may be determined through an iterative process. By comparing sample resistance values, and their resulting equalization settings, against those constraints, modifications to the resistance values can be made (and further comparisons can be made) until those constraints are met. An example embodiment that achieves the aforementioned goals is described below with reference to FIGS. 8A-C.

A selected equalization setting may be achieved through a combination of enabling and disabling particular conductance channels in accordance with their respective resistance values. Because the groups 712*a-e* may each have different resistance values, a specific combination of conductance channels may be necessary to achieve the selected equalization setting. Thus, the 5-bit code corresponds to a requisite combination of conductance channels for achieving a selected equalization setting, and, when received by the groups 712*a-e* in parallel, cause the pull-up circuit 700*c* to provide that equalization setting.

A voltage-mode equalizer, such as the voltage mode transmitter equalizer 100 described above with reference to FIG. 6A, may implement the pull-up circuit 700*c* of FIG. 7C. In such a configuration, a pull-down circuit, being configured in a similar manner as the pull-up circuit 700*c*, may be implemented to operate with the pull-up circuit 700*c*. By configuring the conductance channels of the pull-down circuit to have resistance values of R1 through R5, the pull-down circuit may match the equalization settings of the pull-up circuit. As a result, impedance across the voltage-mode transmitter may be maintained during transmission of a signal.

Figure 8A:
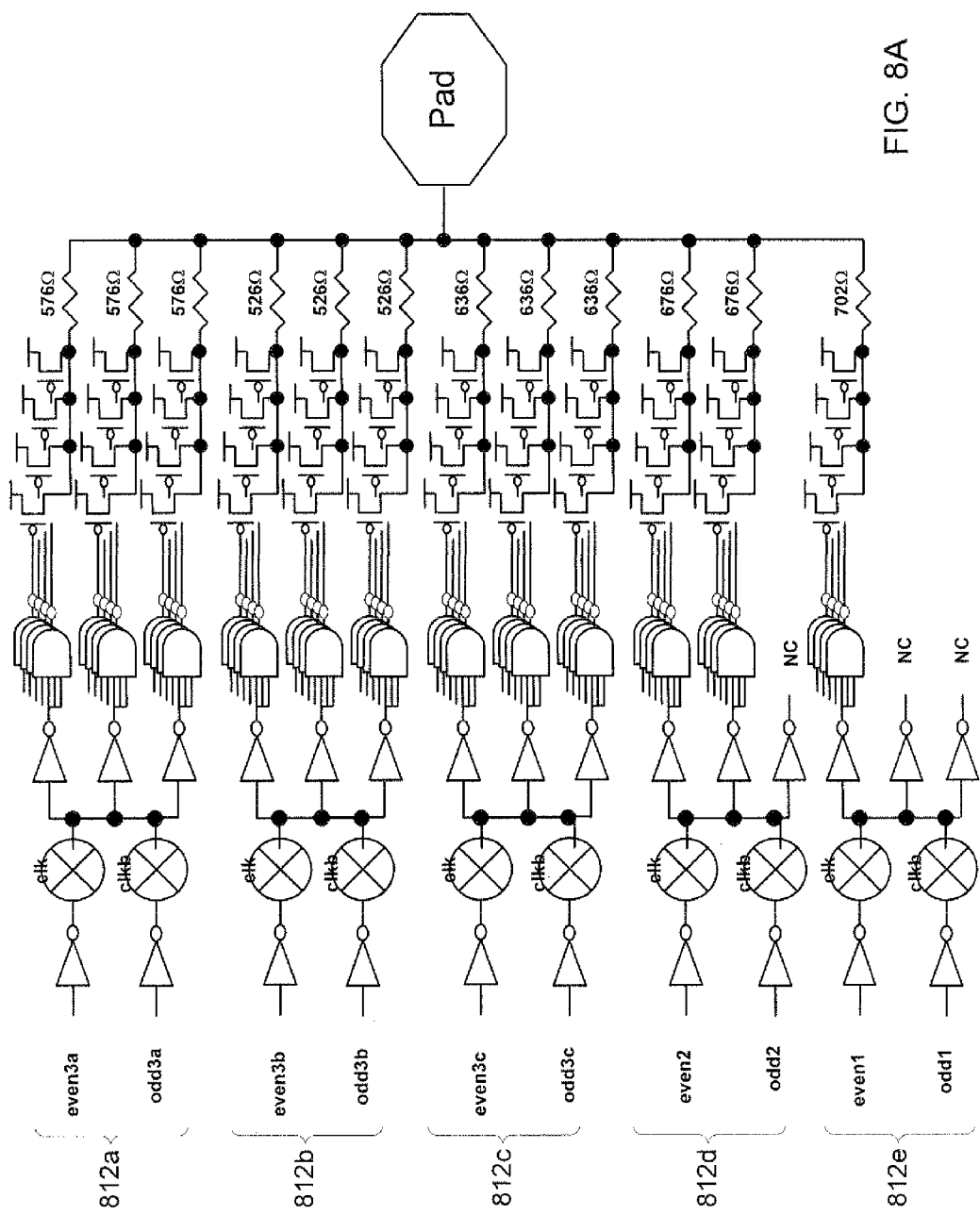
FIG. 8A illustrates a pull-up circuit.

FIG. 8A illustrates a pull-up circuit similar to that of FIG. 7C, actual resistance values for R1-R5. As described above, a voltage-mode transmitter equalizer may implement such a pull-up circuit with a corresponding pull-down circuit having a similar configuration, as well as a shunt resistor. Group 812*a* includes 3 conductance channels each having a resistance value of 576 ohms; group 812*b* includes 3 conductance channels each having resistance value of 526 ohms; group 812*c* includes 3 conductance channels each having a resistance value of 636 ohms; group 812*d* includes 2 conductance channels each having a resistance value of 676 ohms; and group 411*e* includes a single conductance channel having a resistance value of 702 ohms. The specific resistance values shown may achieve all of the goals relating to equalization levels that were described above with reference to FIG. 7C: 1) all resistance values are within 16% of the mean resistance value; 2) the pull-up circuit can attain specific equalization settings required for PCIe; and 3) the resulting equalization settings are substantially linear over an attenuation range of 0 to −13 dB. Further discussion of these characteristics is described below with reference to FIGS. 8B and 8C.

FIG. 8B is a table illustrating the equalization settings obtained by the pull-up converter of FIG. 8A as a result of enabling and disabling the conductance channels in various combinations. Each equalization setting is matched to a switched combination of conductance channels, which can be reduced to a "code" (as described above with reference to FIG. 7C) for asserting the conductance channels to achieve the equalization setting. For example, with conductance channels of groups 812*a* and 812*e* ("3*a*, 1") enabled (switched), an equalization of −3.5 dB can be achieved. This setting, as well as −6 dB, is required for the PCIe communications protocol. Both of these equalization settings can be obtained by the pull-up circuit of FIG. 8B.

Figure 8C:
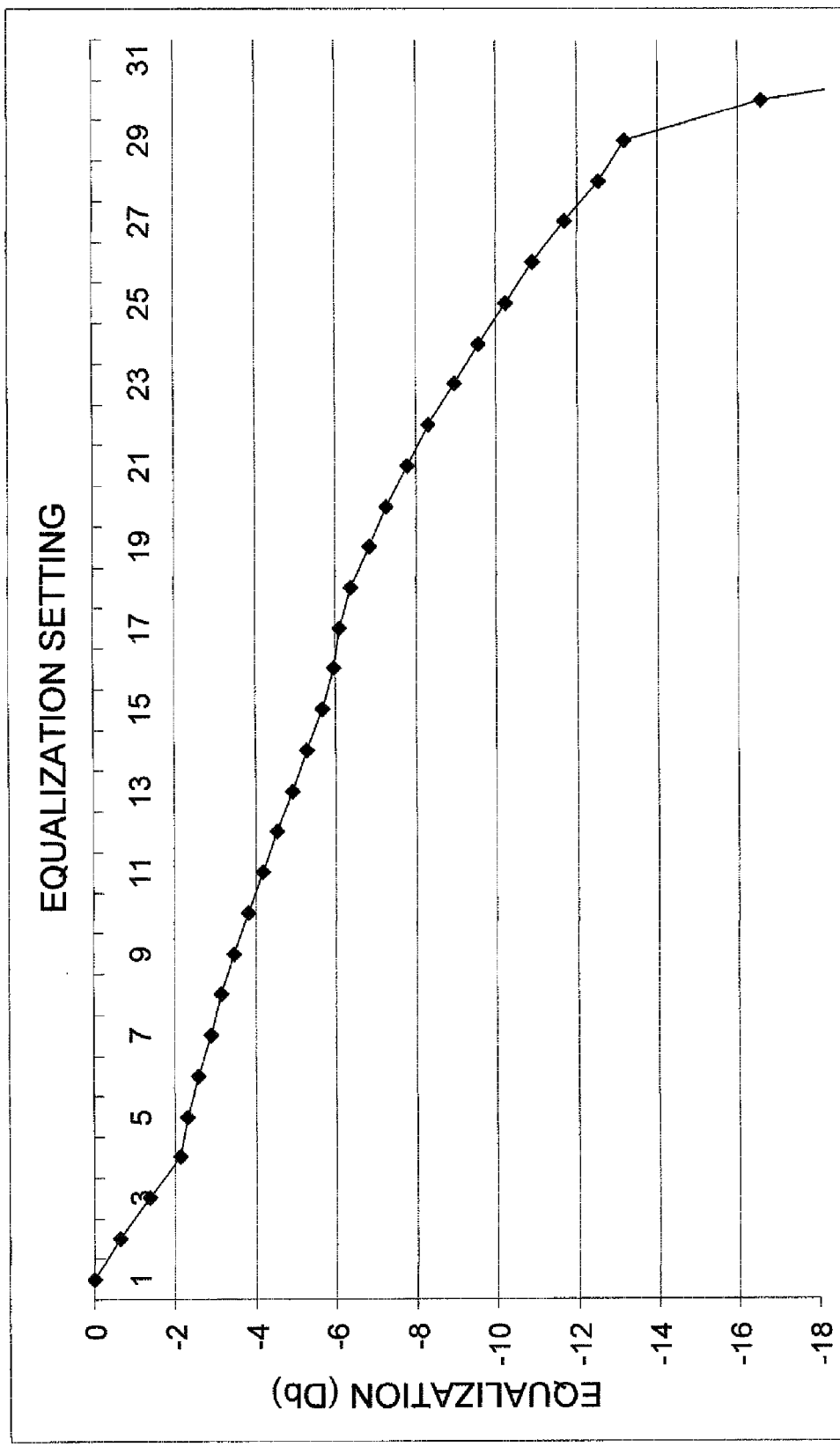
FIG. 8C is a graph illustrating the equalization settings of FIG. 8B.

FIG. 8C is a graph illustrating the equalization settings shown above in FIG. 8B. This plot demonstrates that, within the range of 0 to −13 dB, the equalization settings are distributed in a substantially linear manner.

Embodiments may differ from the circuitry described above. For example, a greater or lesser number of conductance channels may be implemented, and those conductance channels may be combined into groups having additional or fewer conductance channels.

Figure 8D:
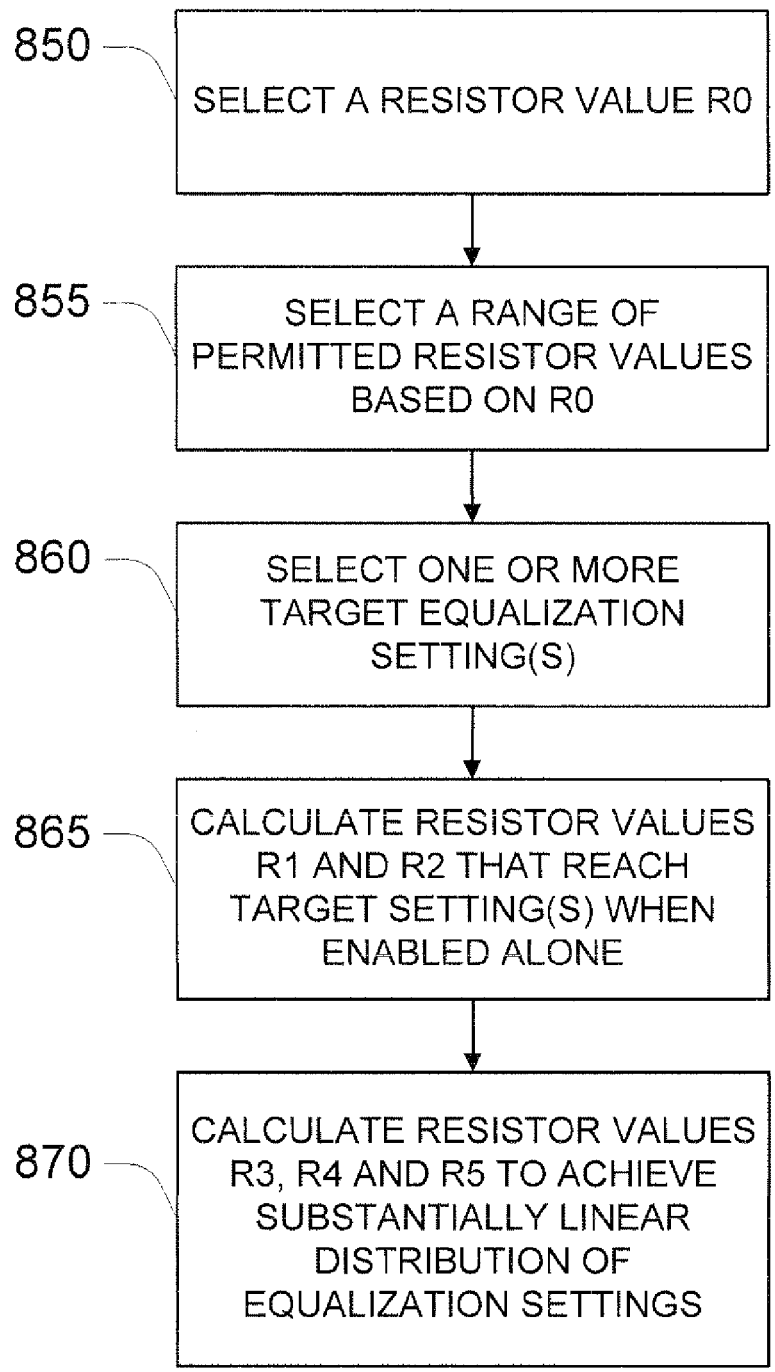
FIG. 8D is a flow chart illustrating a procedure for configuring a voltage-mode transmitter equalizer.

FIG. 8D is a flow chart illustrating a procedure for configuring a voltage-mode transmitter equalizer, and in particular for selecting resistance values for each of the conductance channels. The procedure may be implemented for configuring the resistance values of the pull-up and pull-down circuits described above, enabling fine granularity of equalization settings for the respective voltage-mode transmitter equalizer.

A resistance value R0 is first selected to establish a resistance value by which the selected resistance values will be constrained (850). This value may be a target mean value. A range of permitted values is then selected so as to constrain the range of possible selected resistance values (855). For example, a resistance value of 600 ohms may be selected as R0, and a range of permitted values may be established at 25%, or 150 ohms. As a result, permitted resistance values will be bound between 850 ohms and 750 ohms. This constraint is effective in simplifying the process of selecting the resistance values, as well as ensuring that the resistance values conform to further requirements in implementation, such as in integrated circuit architecture.

One or more target equalization settings are then selected (860). The target settings may be, for example, settings required for a particular communications protocol. Following this selection, the first two resistance values R1 and R2 are calculated according to the above constraints such that, when enabled alone or in combination, the respective conduction paths provide the one or more target equalization settings (865). This calculation ensures that the equalization settings of highest importance are accurately attained.

Lastly the remaining resistance values R3, R4, R5 are calculated, within the aforementioned constraints, so as to achieve a substantially linear distribution of equalization settings (870). Such calculation may be completed iteratively, or by solving a set of equations corresponding to the above constraints. If a substantially linear distribution cannot be achieved, the calculation of R1 and R2 may be repeated (865) to achieve different values, thereby permitting different equalization settings when calculating R3, R4 and R5 again.

While this embodiments disclosed above have been particularly shown and described with references to example embodiments thereof, it will be understood by those skilled in the art that various changes in form and details may be made therein without departing from the scope of the disclosure encompassed by the appended claims.

What is claimed is:

1. A voltage-mode transmitter for outputting a signal over a pair of transmission lines, comprising:
    a first driver coupled to a first one of the pair of transmission lines and having a pull-up circuit and a pull down circuit, the pull-up circuit having a variable pull-up conductance that varies with an amount of equalization applied to the signal according to a first relation; and
    a shunt circuit coupled between the pair of transmission lines and having a variable shunt conductance that varies with the amount of equalization applied to the signal according to a second relation.

2. The voltage-mode transmitter of claim 1, wherein the pull-down circuit has a variable pull-down conductance that varies with the amount of equalization applied to the signal according to a third relation.

3. The voltage-mode transmitter of claim 1, wherein the pull down circuit has a pull-down conductance that does not vary with the amount of equalization applied to the signal.

4. The voltage-mode transmitter of claim 1, further comprising:
    a second driver coupled to a second one of the pair of transmission lines having a structure substantially the same as the first driver and mirroring the first driver in conductance settings.

5. The voltage-mode transmitter of claim 1, further comprising a driver controller configured to control the variable pull-up conductance according to the first relation and to control the variable shunt conductance according to the second relation.

6. A circuit for equalizing output of a voltage-mode transmitter, comprising:
    a terminal for coupling to a signal transmission line;
    a pull-up circuit coupled to the terminal and having a variable pull-up conductance defined by selectively enabling a first plurality of conductance channels each having a resistance value, the resistance values of at least a subset of the first plurality of conductance channels being distinct from each other; and
    a pull-down circuit coupled to the terminal and having a variable pull-down conductance defined by selectively enabling a second plurality of conductance channels each having a resistance value, the resistance values of at least a subset of the second plurality of conductance channels being distinct from each other;
    wherein the variable pull-up conductance and variable pull-down conductance are varied such that an impedance of the circuit at the terminal corresponds to an impedance of the signal transmission line during transitions of a signal at the signal transmission line.

7. The circuit of claim 6, wherein each of the conductance channels includes a switching element connected in series with a resistor, the switching element enabling or disabling the conductance channel in response to a control signal.

8. The circuit of claim 7, wherein each of the resistors in the first plurality of conductance channels has a width that is uniform across the first plurality of conductance channels.

9. The circuit of claim 7, wherein the control signal is responsive to an input data signal.

10. The circuit of claim 6, wherein the variable pull-up conductance has a number of distinct attenuation settings, the number of distinct attenuation settings being greater than the number of the first plurality of conductance channels.

11. The circuit of claim 10, wherein the number of distinct attenuation settings is at least twice the number of the first plurality of conductance channels.

12. The circuit of claim 10, wherein the distinct attenuation settings have a substantially linear distribution over a range of attenuation values, the range encompassing all of the distinct attenuation settings.

13. The circuit of claim 6, wherein the resistance values of the subset of the first plurality of conductive channels correspond to respective ones of a set of distinct resistance values that are selected from a predetermined range of resistance values to provide a substantially linear distribution of attenuation settings.

14. The circuit of claim 13, wherein the set of distinct resistance values are selected to provide at least one attenuation setting compliant with a communications protocol associated with the output of the voltage-mode transmitter.

15. The circuit of claim 13, wherein a variation of the resistance values in the first plurality of conductance channels is less than 25% of a mean resistance value.

16. The circuit of claim 15, wherein the mean resistance value is approximately 600 ohms.

17. The circuit of claim 6, wherein the first and second pluralities of conductance channels each have 12 conductance channels and provide at least 30 distinct attenuation settings.

18. The circuit of claim 17, wherein the first plurality of conductance channels have resistance values that include 526, 576, 636, 676 and 702 ohms.

19. The circuit of claim 6, further comprising:
    an additional terminal for coupling to an additional signal transmission line;
    an additional pull-up circuit;
    an additional pull-down circuit; and
    a shunt circuit coupled between the terminal and the additional terminal and providing a variable shunt conductance.

20. The circuit of claim 6, wherein the first plurality of conductance channels includes multiple groups of conductance channels controlled by respective bits of a control signal, the resistance values of each group of conductance channels are uniform across the group of conductance channels but are distinct from the resistance values of another group of conductance channels.

21. The circuit of claim 20, wherein at least two groups of conductance channels have different numbers of conductance channels.

22. The circuit of claim 6, further comprising a shunt circuit coupled to the terminal and having a variable shunt conductance that varies relative to at least one of the pull-up conductance and the pull-down conductance.

23. The circuit of claim 6, further comprising a driver controller configured to control the variable pull-up conductance and the variable pull-down conductance.

24. A voltage-mode transmitter for outputting a differential signal, comprising:
- a driver controller configured to receive a data signal and to generate a plurality of control signals in response to the data signal; and
- a voltage-mode driver configured to transmit an output signal based on the control signals received from the data controller, the voltage-mode driver comprising:
  - a pull-up circuit having multiple groups of conductance channels controlled by at least one of the control signals, each conductance channel having a resistance value, a resistance value of each conductance channel of a first group being distinct from a resistance value of each conductance channel of a second group;
  - wherein the driver controller controls the pull-up circuit to vary conductance of the pull-up circuit such that an impedance of the voltage-mode driver corresponds to an impedance of a signal transmission line during transitions of the output signal at the signal transmission line.

25. The voltage-mode transmitter of claim 24, further comprising:
- a pull-down circuit having multiple groups of conductance channels controlled by at least one of the plurality of control signals, each conductance channel having a resistance value, the resistance value of a conductance channel of a third group being distinct from a resistance value of a conductance channel of a fourth group.

26. The voltage-mode transmitter of claim 24, wherein the resistance values of each group of conductance channels are uniform across the group of conductance channels but are distinct from the resistance values of a different group of conductance channels.

27. The voltage-mode transmitter of claim 24, wherein the voltage-mode driver further comprises a shunt circuit having a variable shunt conductance that varies based on at least one of the control signals.

28. A method of configuring a circuit for equalizing output of a voltage-mode transmitter having a pull-up circuit and a pull-down circuit, each of the pull-up and pull-down circuits including a plurality of conductance channels, the method comprising:
- selecting a resistance value;
- selecting at least one attenuation setting;
- based on the selected resistance value and at least one attenuation setting, calculating a set of distinct resistance values for the plurality of conductance channels such that, by selectively enabling the plurality of conductance channels, the pull-up circuit and pull-down circuit provide a substantially linear distribution of attenuation settings including the at least one attenuation setting.

29. The method of claim 28, further comprising selecting a shunt resistance based on the calculated resistance values.

30. An apparatus for configuring a circuit for equalizing output of a voltage-mode transmitter having a pull-up circuit and a pull-down circuit, each of the pull-up and pull-down circuits including a plurality of conductance channels, the apparatus comprising:
- means for selecting a resistance value;
- means for selecting at least one attenuation setting;
- means for calculating, based on the selected resistance value and at least one attenuation setting, a set of distinct resistance values for the plurality of conductance channels such that, by selectively enabling the plurality of conductance channels, the pull-up circuit and pull-down circuit provide a substantially linear distribution of attenuation settings including the at least one attenuation setting.

* * * * *